United States Patent
Kim

(10) Patent No.: US 12,231,973 B2
(45) Date of Patent: Feb. 18, 2025

(54) METHOD AND APPARATUS FOR PERFORMING SMALL DATA TRANSMISSION FOR A TERMINAL IN WIRELESS MOBILE COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: Blackpin Inc., Seoul (KR); Soenghun Kim, Hanam-si (KR)

( * ) Notice: Subject to any disclaimer, the term of this patent is extended or adjusted under 35 U.S.C. 154(b) by 117 days.

(21) Appl. No.: 18/137,439

(22) Filed: Apr. 21, 2023

(65) Prior Publication Data
US 2023/0370914 A1    Nov. 16, 2023

(30) Foreign Application Priority Data

May 11, 2022    (KR) .................. 10-2022-0057689

(51) Int. Cl.
*H04W 72/21* (2023.01)
*H04W 36/00* (2009.01)
(Continued)

(52) U.S. Cl.
CPC ....... *H04W 36/0077* (2013.01); *H04W 36/30* (2013.01); *H04W 72/21* (2023.01); *H04W 72/231* (2023.01); *H04W 76/30* (2018.02)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

2023/0380003 A1*  11/2023  Agiwal .............. H04W 76/19
2024/0080833 A1*  3/2024  Jeon .................. H04W 28/0278

OTHER PUBLICATIONS

3GPP TS 38.321 v16.8.0, $3^{rd}$ Generation Partnership Project, Technical Specification Group Radio Access Network, Medium Access control (MAC) protocol specification (release 16), Mar. 2022, 159 pages.

(Continued)

*Primary Examiner* — Bo Hui A Zhu
(74) *Attorney, Agent, or Firm* — Fish & Richardson P.C.

(57) ABSTRACT

A Method and Apparatus for performing small data transmission is provided. The method includes receiving a RRCRelease, the RRCRelease includes a first information for SDT, the first information for SDT includes a SRB2 (Signaling Radio Bearer2) indicator and a DRB (Data Radio Bearer) list, performing cell selection, receiving a SystemInformationBlock1 in a selected cell, the SystemInformationBlock1 includes a second information for SDT (Small Data Transmission), initiating a SDT based on the first information and the second information, transmitting a Medium Access Control (MAC)) Protocol Data Unit (PDU) including Common Control Channel (CCCH) Service Data Unit (SDU) for initial Physical Uplink Shared Channel (PUSCH) transmission, starting a first timer, monitoring PDCCH for a first identifier based on a first search space or a second search space, and stopping the first timer when a downlink assignment for the first identifier is received via Physical Downlink Control Channel (PDCCH).

4 Claims, 9 Drawing Sheets

(51) Int. Cl.
  *H04W 36/30* (2009.01)
  *H04W 72/231* (2023.01)
  *H04W 76/30* (2018.01)
(58) Field of Classification Search
  CPC ..... H04W 72/50; H04W 72/51; H04W 72/52; H04W 72/53; H04W 72/54; H04W 72/541; H04W 72/542; H04W 72/543; H04W 72/56
  See application file for complete search history.

(56) References Cited

OTHER PUBLICATIONS

Ericsson, "Action on receiving indication of failure to perform SDT procedure", R2-2206335, 3GPP TSG-RAN WG2 #118-e, Electronic Meeting, May 9, May 20, 2022, 3 pages.
MediaTek Inc., R4-2205923, RRM requirements for CG-SDT, 3GPP TSG-RAN WG4 Meeting #102-e Electronic Meeting, Feb. 21-Mar. 3, 2022, 10 pages.
Vivo, "Remaining UP Issues on SDT Procedure", R2-2202983, 3GPP TSG-RAN WG2 Meeting #117—electronic Online, Feb. 21-Mar. 3, 2022, 4 pages.
ZTE Corporation (Rapporteur), China Telecom, , R2-2203768, 'Introduction of SDT, 3GPP TSG-RAN WG2 Meeting #117-e Electronic, Feb. 21-Mar. 3, 2022, 946 pages.
Office Action in Korean Appln No. 10-2022-0057689, mailed on Sep. 19, 2023, 5 pages (with English Translation).
Office Action in Korean Appln No. 10-2022-0057689, mailed on May 8, 2023, 4 pages (with English Translation).

\* cited by examiner

FIG. 1B
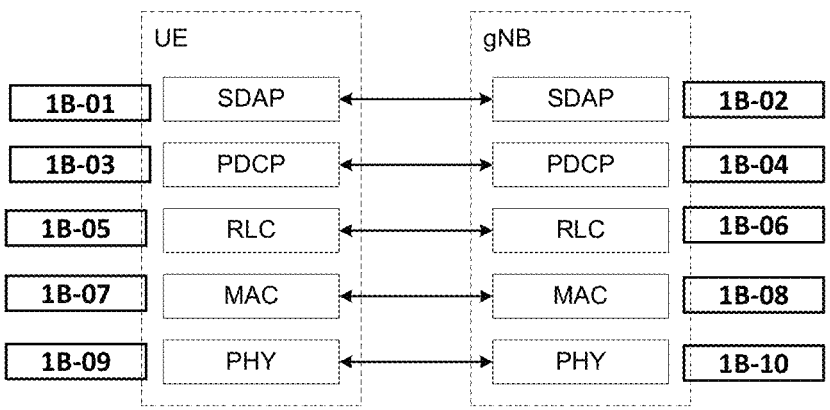
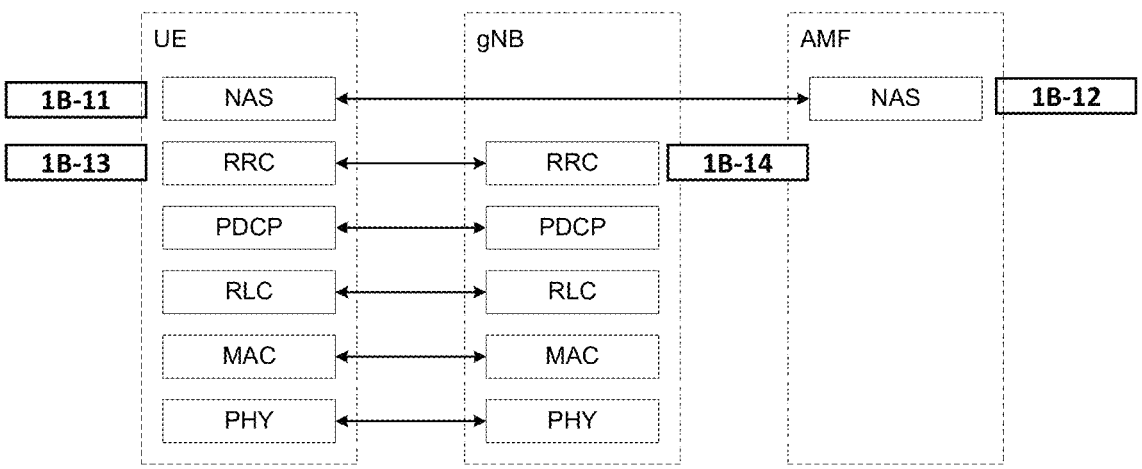

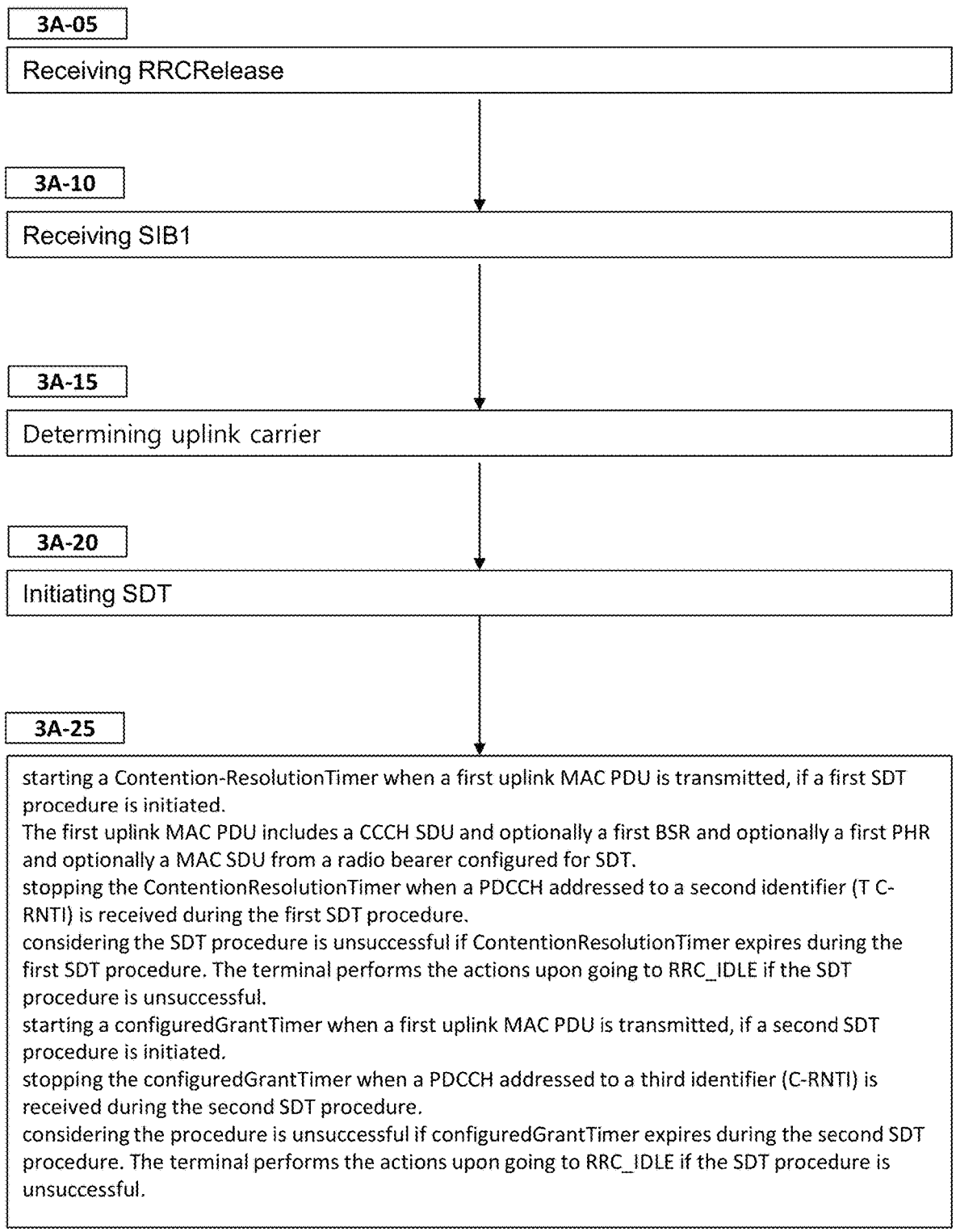

METHOD AND APPARATUS FOR PERFORMING SMALL DATA TRANSMISSION FOR A TERMINAL IN WIRELESS MOBILE COMMUNICATION SYSTEM

CROSS-REFERENCE TO RELATED APPLICATION

This application claims priority to and the benefit of Korean Patent Application No. 10-2022-0057689, filed on May 11, 2022, the disclosure of which is incorporated herein by reference in its entirety.

BACKGROUND

Technical Field

The present disclosure relates to performing small data transmission for a terminal in wireless mobile communication system.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

To achieve smaller latency, uplink transmission from RRC_INACTIVE UE is required.

SUMMARY

Aspects of the present disclosure are to address problem of small data transmission. The method includes receiving a RRCRelease, the RRCRelease includes a first information for SDT, the first information for SDT includes a SRB2 (Signaling Radio Bearer2) indicator and a DRB (Data Radio Bearer) list, performing cell selection, receiving a SystemInformationBlock1 in a selected cell, the SystemInformationBlock1 includes a second information for SDT (Small Data Transmission), initiating a SDT based on the first information and the second information, transmitting a Medium Access Control (MAC)) Protocol Data Unit (PDU) including Common Control Channel (CCCH) Service Data Unit (SDU) for initial Physical Uplink Shared Channel (PUSCH) transmission, starting a first timer, monitoring PDCCH for a first identifier based on a first search space or a second search space, and stopping the first timer when a downlink assignment for the first identifier is received via Physical Downlink Control Channel (PDCCH).

BRIEF DESCRIPTION OF THE DRAWINGS

FIG. 1B is a diagram illustrating a wireless protocol architecture in an 5G system to which the disclosure may be applied.

FIG. 3 is a flow diagram illustrating an operation of a terminal.

DETAILED DESCRIPTION

Figure 1A:
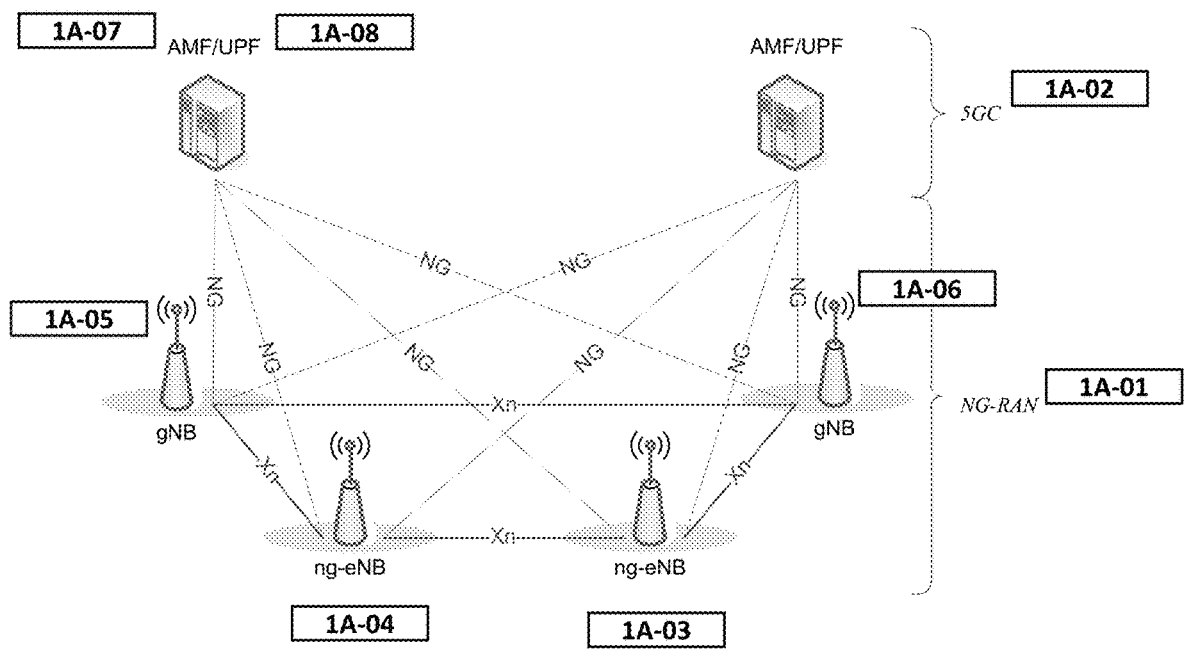
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
| --- | --- | --- | --- |
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |

TABLE 1-continued

| Acronym | Full name | Acronym | Full name |
| --- | --- | --- | --- |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CS-RNTI | Configured Scheduling-RNTI |
| PRB | Physical Resource Block | TAG | Timing Advance Group |
| PSS | Primary Synchronisation Signal | SDT | Small Data Transmission |
| PUCCH | Physical Uplink Control Channel | RA-SDT | Random Access -SDT |
| PUSCH | Physical Uplink Shared Channel | CG-SDT | Configured Grant-SDT |
| PTAG | Primary TAG | STAG | Secondary TAG |

Table 2 lists the terminologies and their definition used throughout the present disclosure.

TABLE 2

| Terminology | Definition |
| --- | --- |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a |

TABLE 2-continued

| Terminology | Definition |
| --- | --- |
| | specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above. |

TABLE 2-continued

| Terminology | Definition |
| --- | --- |
| | The cell selection criterion S is fulfilled (i.e. RSRP and RSRQ are better than specific values |

In the present invention, "trigger" or "triggered" and "initiate" or "initiated" may be used in the same meaning. In the present invention, "radio bearer second resume procedure is allowed", "radio bearer second resume procedure is configured" and "radio bearer second resume procedure is enabled" may be used in the same meaning. In the present invention, second resume procedure and Small Data Transfer (SDT) may be used in the same meaning. In the present invention, UE and terminal may be used in the same meaning. In the present invention, base station and NG-RAN node may be used in the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:
- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |

TABLE 3-continued

| Sublayer | Functions |
| --- | --- |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
| --- | --- |
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG-RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. |
| RRC_CONNECTED | 5GC - NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
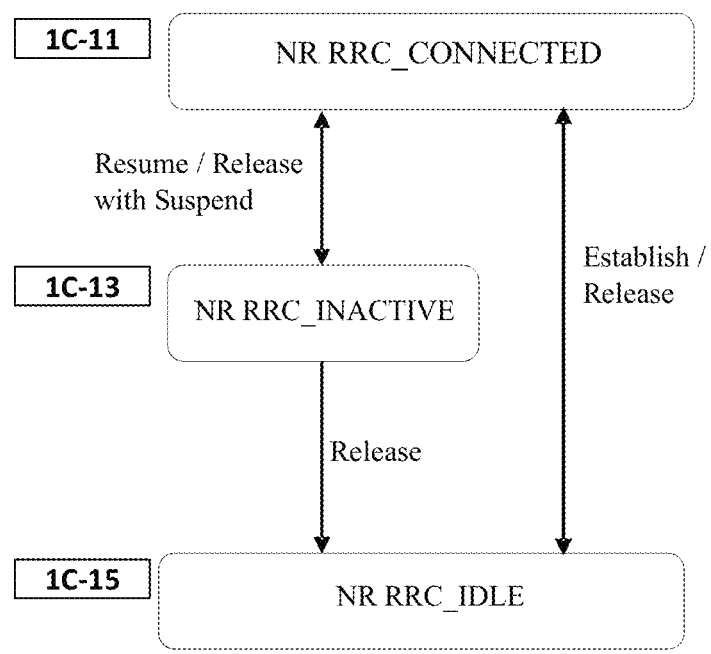
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC IDLE 1C-15 through RRC connection establishment and RRC connection release.

The state transition from RRC_INACTIVE to RRC_CONNECTED involves not only signal exchange between the terminal and the base station, but also context transfer and data path change between the base stations. If the terminal has enough data to transmit, these additional procedures can be sufficiently justified, but if not, excessive overhead can reduce the efficiency of the network.

The present invention introduces a new resumption procedure capable of transmitting and receiving data without transition to RRC_CONNECTED. Hereinafter, a resume procedure for the purpose of transitioning the terminal to the RRC_CONNECTED state from the RRC_INACTIVE state is referred to as a first resume procedure, and a procedure for transmitting and receiving data while the terminal is in the RRC_INACTIVE state is referred to as a second resume procedure. Through the first resume procedure, the terminal may resume the suspended RRC connection, and through the second resumption procedure, the terminal may resume data transmission and reception. The terminal may switch to the first resume procedure while performing the second resume procedure.

The second resume procedure is performed either via random access procedure or via configured grant. Each are called RA-SDT and CG-SDT respectively.

Figure 1D:
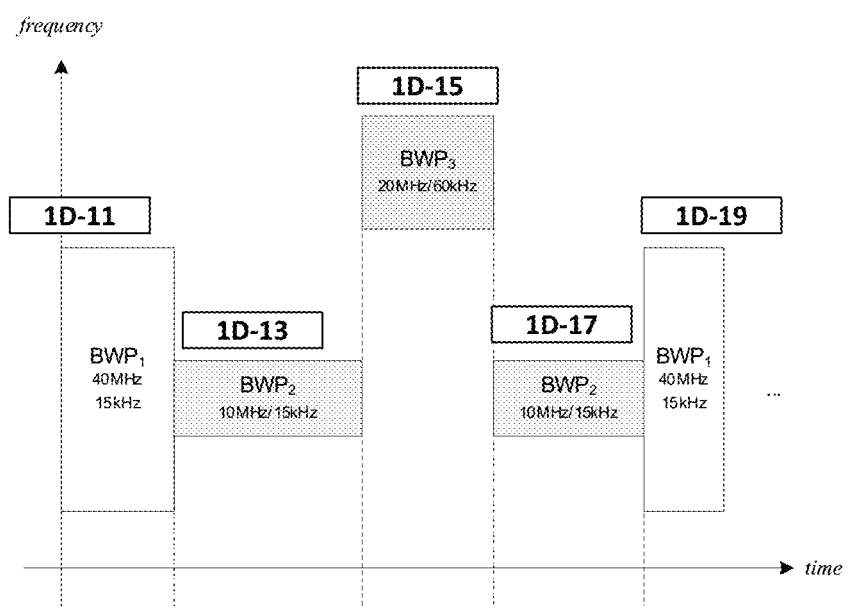
FIG. 1D is a diagram illustrating an example of a bandwidth part.

FIG. 1D is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1D describes a scenario where 3 different BWPs are configured:
 BWP1 with a width of 40 MHz and subcarrier spacing of 15 kHz; 1D-11 or 1D-19
 BWP2 with a width of 10 MHz and subcarrier spacing of 15 kHz; 1D-13 or 1D-17
 BWP3 with a width of 20 MHz and subcarrier spacing of 60 kHz. 1D-15

Figure 1E:
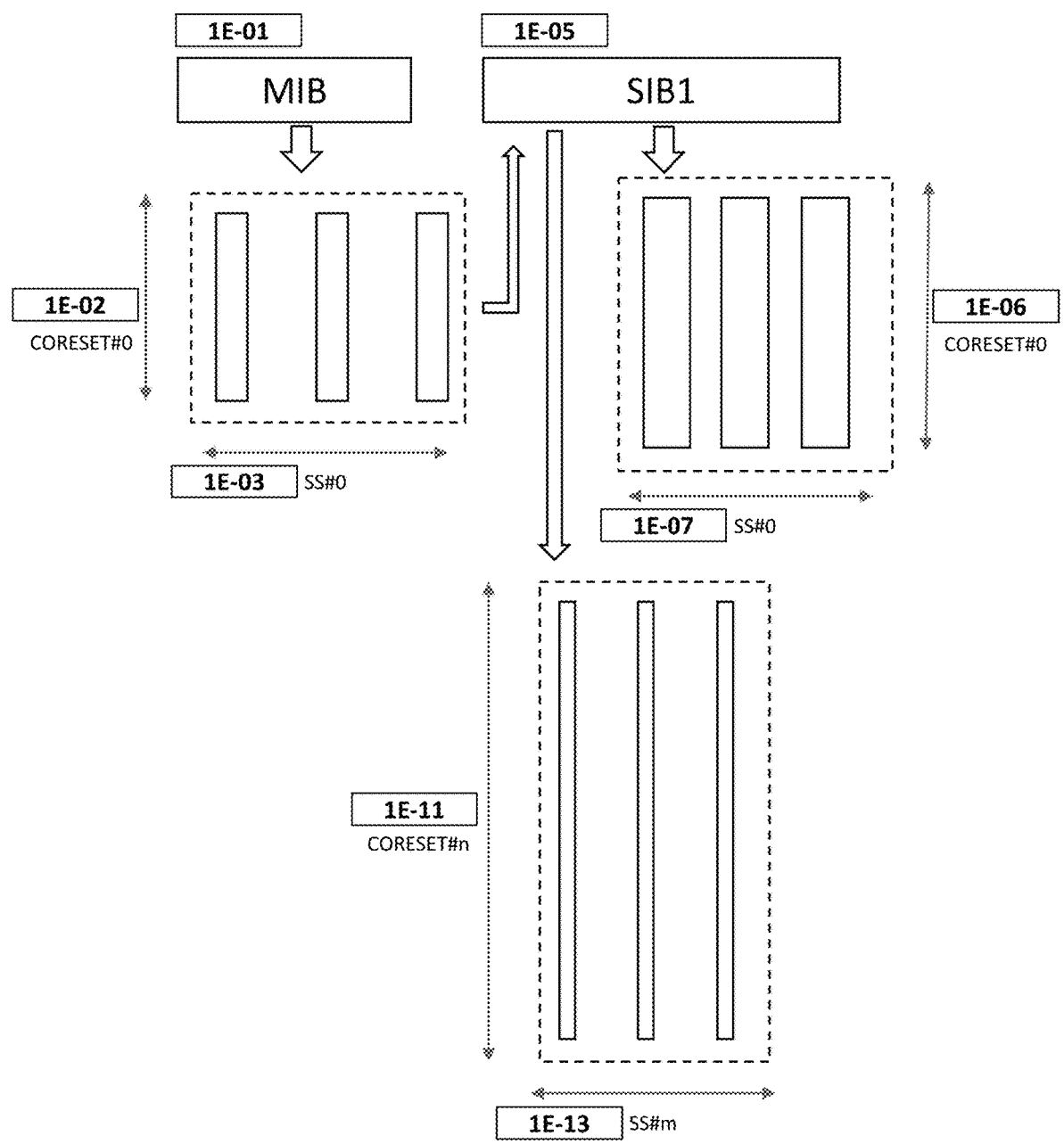
FIG. 1E is a diagram illustrating an example of a search space and a control resource set.

FIG. 1E is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1E-01, the UE recognizes CORESET #0 1E-02 and SS #0 1E-03 for receiving SIB1 using predetermined information included in the MIB. The UE receives SIB1 1E-05 through CORESET #0 1E-02 and SS #0 1E-03. In SIB1, information constituting CORESET #0 1E-06 and SS #0 1E-07 and information constituting another CORESET, for example, CORESET #n1E-11 and SS #m 1E-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 1E-02 configured in MIB and CORESET #0 1E-06 configured in SIB1 may be different from each other, and the former is called a first CORESET #0 and the latter is called a second CORESET #0. SS #0 1E-03 configured in MIB and SS #0 1E-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with one or more DL BWPs and one or more UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

tdd-UL-DL-ConfigurationCommon is cell specific TDD UL/DL configuration. It consists of subfields such as referenceSubcarrierSpacing, pattern1, and pattern2.

referenceSubcarrierSpacing is the reference SCS used to determine the time domain boundary in the UL-DL pattern.

pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

dl-UL-TransmissionPeriodicity indicates the period of the DL-UL pattern.

nrofDownlinkSlots indicates the number of consecutive full DL slots in each DL-UL pattern.

nrofDownlinkSymbols indicates the number of consecutive DL symbols from the beginning of the slot following the last full DL slot.

nrofUplinkSlots indicates the number of consecutive full UL slots in each DL-UL pattern.

nrofUplinkSymbols indicates the number of consecutive UL symbols at the last time point of a slot preceding the first full UL slot.

slots between the last full DL slot and the first full UL slot are flexible slots. full UL slot is also called static UL slot. UL slot in this disclosure is static UL slot.

DownlinkConfigCommonSIB includes BWP-DownlinkCommon IE for initial DL BWP. UplinkConfigCommonSIB includes BWP-UplinkCommon IE for initial UL BWP. BWP-id of initialDownlinkBWP is 0.

A RRCReconfiguration message includes one or more BWP-Downlink and one or more BWP-Uplink and a firstActiveDownlinkBWP-Id and a bwp-InactivityTimer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP It includes Type2GapStatus. Type2GapStatus IE is enumerated with a single value of "deactivated". Alternatively, Type2GapStatus IE is enumerated with a single value of "activated". Alternatively, Type2GapStatus IE is enumerated with two values of "deactivated" and "activated". Alternatively, Type2GapStatus IE includes an DL BWP-Id.

The BWP-UplinkDedicated is used to configure the dedicated (UE specific) parameters of an uplink BWP.

FirstActiveDownlinkBWP-Id contains the ID of the DL BWP to be activated upon performing the RRC (re-)configuration.

DefaultDownlinkBWP-Id is the ID of the downlink bandwidth part to be used upon expiry of the BWP inactivity timer.

BWP-InactivityTimer is the duration in ms after which the UE falls back to the default Bandwidth Part.

Small Data Transmission (SDT) is a procedure allowing data and/or signalling transmission while remaining in RRC_INACTIVE state (i.e. without transitioning to RRC_CONNECTED state).

SDT procedure is initiated with either a transmission over RACH (configured via system information) or over Type 1 CG resources (configured via dedicated signalling in RRCRelease). The SDT resources can be configured on initial BWP for both RACH and CG. RACH and CG resources for SDT can be configured on either or both of NUL and SUL carriers. The CG resources for SDT are valid only within the cell UE received RRCRelease and transitioned to RRC_INACTIVE state. For RACH, the network can configure 2-step and/or 4-step RA resources for SDT. When both 2-step and 4-step RA resources for SDT are configured, UE selects the RA type.

The initial PUSCH transmission during the SDT procedure includes at least the CCCH message. When using CG resources for initial SDT transmission, UE can perform autonomous retransmission of the initial transmission if UE does not receive confirmation from the network (dynamic UL grant or DL assignment) before a configured timer expires. After the initial PUSCH transmission, subsequent transmissions are handled differently depending on the type of resource used to initiate the SDT procedure:

When using CG resources, the network can schedule subsequent UL transmissions using dynamic grants or they can take place on the following CG resource occasions. The DL transmissions are scheduled using dynamic assignments. UE can initiate subsequent UL transmission only after reception of confirmation (dynamic UL grant or DL assignment) for the initial PUSCH transmission from the network. For subsequent UL transmission, UE cannot initiate re-transmission over a CG resource.

When using RACH resources, the network can schedule subsequent UL and DL transmissions using dynamic UL grants and DL assignments, respectively, after the completion of the RA procedure.

While the SDT procedure is ongoing, if data appears in a buffer of any radio bearer not enabled for SDT, UE initiates a transmission of a non-SDT data arrival indication using UEAssistanceInformation message to the network and, if available, includes the resume cause.

SDT procedure over CG resources can only be initiated with valid UL timing alignment. The UL timing alignment is maintained by UE based on a SDT-specific timing alignment timer configured by the network via dedicated signalling and, for initial CG-SDT transmission, also by DL RSRP of configured number of highest ranked SSBs which are above a configured RSRP threshold. Upon expiry of the SDT-specific timing alignment timer, the CG resources are released while maintaining the CG resource configuration.

Logical channel restrictions configured by the network while in RRC_CONNECTED state and/or in RRCRelease message for radio bearers enabled for SDT, if any, are applied by UE during SDT procedure.

The network may configure UE to apply ROHC continuity for SDT either when UE initiates SDT in the cell where UE received RRCRelease and transitioned to RRC_INACTIVE state or when UE initiates SDT in a cell of its RNA.

The network may configure UE to apply EHC continuity for SDT either when UE initiates SDT in the cell where UE received RRCRelease and transitioned to RRC_INACTIVE state or when UE initiates SDT in a cell of its RNA.

The EHC protocol is based on the Ethernet Header Compression (EHC) framework. The Ethernet header compression (EHC) protocol compresses Ethernet header. The fields that are compressed (i.e. removed from the Ethernet header) by the EHC protocol are: DESTINATION ADDRESS, SOURCE ADDRESS, 802.1Q TAG, and LENGTH/TYPE. The EHC compressor and the EHC decompressor store original header field information as a "EHC context". Each EHC context is identified by a unique identifier, called Context ID (CID). The EHC context must be synchronized between the EHC compressor and the EHC decompressor; otherwise, the EHC decompressor erroneously decompresses the "Compressed Header (CH)" packets.

PDCP entities associated with DRBs can be configured by upper layers to use EHC. Each PDCP entity carrying user plane data may be configured to use EHC. Every PDCP entity uses at most one EHC compressor instance and at most one EHC decompressor instance.

Small Data Transmission (SDT) is a procedure allowing data and/or signalling transmission while remaining in RRC_INACTIVE state (i.e. without transitioning to RRC_CONNECTED state).

SDT procedure is initiated with either a transmission over RACH (configured via system information) or over Type 1 CG resources (configured via dedicated signalling in RRCRelease). The SDT resources can be configured on initial BWP for both RACH and CG. RACH and CG resources for SDT can be configured on either or both of NUL and SUL carriers. The CG resources for SDT are valid only within the cell UE received RRCRelease and transitioned to RRC_INACTIVE state. For RACH, the network can configure 2-step and/or 4-step RA resources for SDT. When both 2-step and 4-step RA resources for SDT are configured, UE selects the RA type.

The initial PUSCH transmission during the SDT procedure includes at least the CCCH message. When using CG resources for initial SDT transmission, UE can perform autonomous retransmission of the initial transmission if UE does not receive confirmation from the network (dynamic UL grant or DL assignment) before a configured timer expires. After the initial PUSCH transmission, subsequent transmissions are handled differently depending on the type of resource used to initiate the SDT procedure:

When using CG resources, the network can schedule subsequent UL transmissions using dynamic grants or they can take place on the following CG resource occasions. The DL transmissions are scheduled using dynamic assignments. UE can initiate subsequent UL transmission only after reception of confirmation (dynamic UL grant or DL assignment) for the initial PUSCH transmission from the network. For subsequent UL transmission, UE cannot initiate re-transmission over a CG resource.

When using RACH resources, the network can schedule subsequent UL and DL transmissions using dynamic UL grants and DL assignments, respectively, after the completion of the RA procedure.

While the SDT procedure is ongoing, if data appears in a buffer of any radio bearer not enabled for SDT, UE initiates a transmission of a non-SDT data arrival indication using UEAssistanceInformation message to the network and, if available, includes the resume cause.

SDT procedure over CG resources can only be initiated with valid UL timing alignment. The UL timing alignment is maintained by UE based on a SDT-specific timing alignment timer configured by the network via dedicated signalling and, for initial CG-SDT transmission, also by DL RSRP of configured number of highest ranked SSBs which are above a configured RSRP threshold. Upon expiry of the SDT-specific timing alignment timer, the CG resources are released while maintaining the CG resource configuration.

Logical channel restrictions configured by the network while in RRC_CONNECTED state and/or in RRCRelease message for radio bearers enabled for SDT, if any, are applied by UE during SDT procedure.

The network may configure UE to apply ROHC continuity for SDT either when UE initiates SDT in the cell where UE received RRCRelease and transitioned to RRC_INACTIVE state or when UE initiates SDT in a cell of its RNA.

The network may configure UE to apply EHC continuity for SDT either when UE initiates SDT in the cell where UE received RRCRelease and transitioned to RRC_INACTIVE state or when UE initiates SDT in a cell of its RNA.

The EHC protocol is based on the Ethernet Header Compression (EHC) framework. The Ethernet header compression (EHC) protocol compresses Ethernet header. The fields that are compressed (i.e. removed from the Ethernet header) by the EHC protocol are: DESTINATION ADDRESS, SOURCE ADDRESS, 802.1Q TAG, and LENGTH/TYPE. The EHC compressor and the EHC decompressor store original header field information as a "EHC context". Each EHC context is identified by a unique identifier, called Context ID (CID). The EHC context must be synchronized between the EHC compressor and the EHC decompressor; otherwise, the EHC decompressor erroneously decompresses the "Compressed Header (CH)" packets.

PDCP entities associated with DRBs can be configured by upper layers to use EHC. Each PDCP entity carrying user plane data may be configured to use EHC. Every PDCP entity uses at most one EHC compressor instance and at most one EHC decompressor instance.

Figure 2:
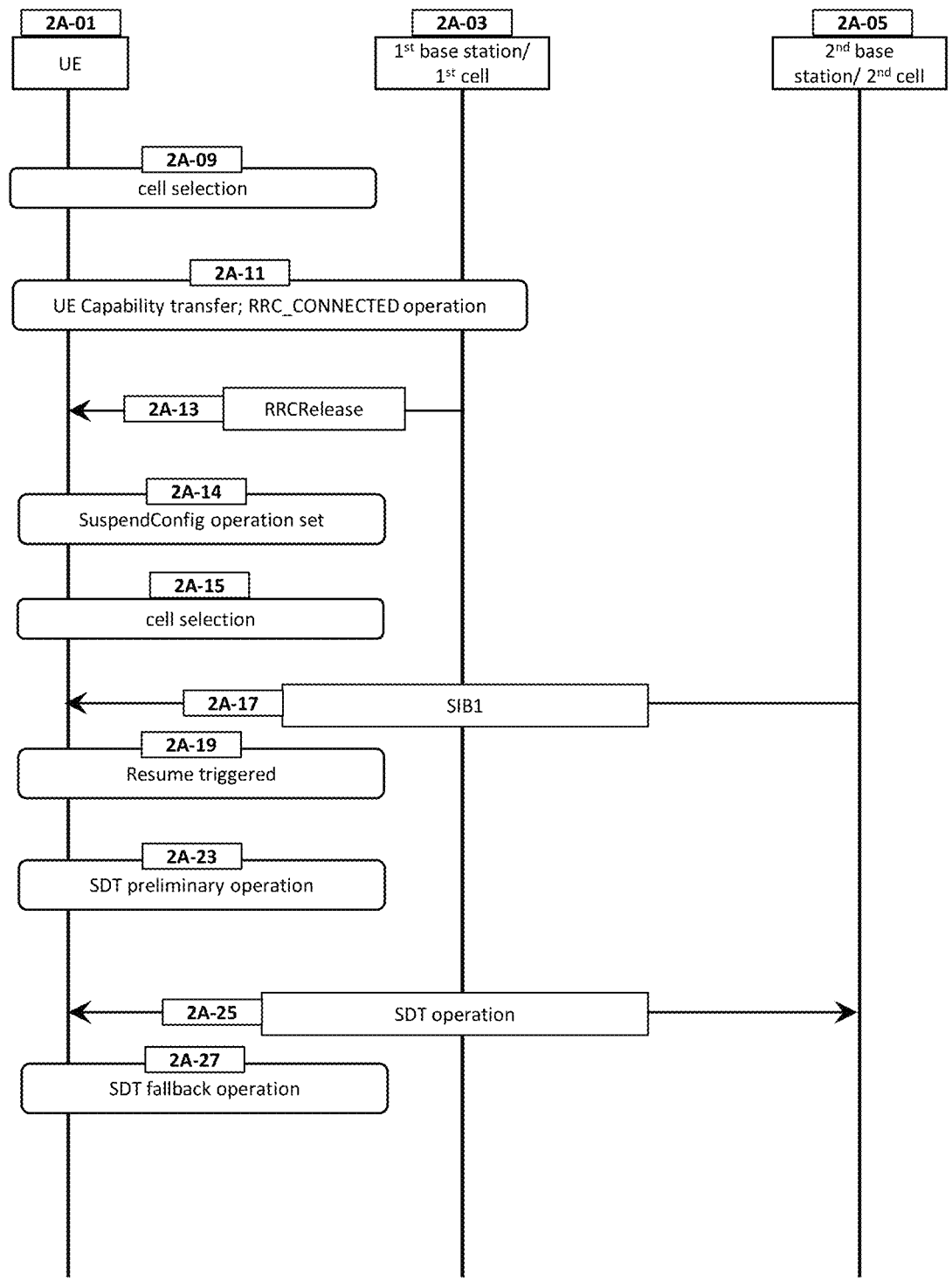
FIG. 2 is a diagram illustrating operations of a terminal and a base station according to an embodiment of the present invention.

FIG. 2 is a diagram illustrating operations of a UE and a base station according to an embodiment of the present invention.

In a wireless communication system including a UE 2A-01, a first base station 2A-03, and a second base station 2A-05, UE and the base station operate as follows.

In step 2A-09, UE selects a first cell of a first base station based at least in part on the reference signal received power of the first cell. UE may perform the random access procedure in the first cell for state transition to RRC_CONNECTED.

In steps 2A-11, UE reports capability to the first base station or another base station. UE capability information transfer procedure consists of transmitting an RRC control message called UECapabilityInformation containing UE capability information to the serving base station if the serving base station transmits an RRC message requesting UE capability information. UECapabilityInformation includes the following parameters.

InactiveState indicates whether UE supports RRC_INACTIVE. It is per UE capability.

RA-SDT indicates whether UE supports transmission of data and/or signalling over allowed radio bearers in RRC_INACTIVE state via Random Access procedure (i.e., RA-SDT). It is per UE capability.

SRB-SDT indicates whether UE supports the usage of signaling radio bearer SRB2 over RA-SDT or CG-SDT. It is per UE capability.

CG-SDT indicates whether UE supports transmission of data and/or signalling over allowed radio bearers in RRC_INACTIVE state via configured grant type 1 (i.e., CG-SDT). It is per band capability.

Per UE capability parameter is signalled per UE. per band capability parameter is signalled per band. per UE capability, if signaled for a UE, is supported in all frequency bands that are supported by UE. per band capability, if signaled for a band, is supported in the corresponding band. UE and the serving base station transmit and receive data in the RRC_CONNECTED state, and when the data transmission and reception are completed, the serving base station determines to transition UE state to the RRC_INACTIVE state.

In step 2A-13, the first base station transmits an RRCRelease message to UE. The RRCRelease message includes SuspendConfig IE, and SuspendConfig includes the following fields.

<SuspendConfig>
1. The first UE identifier: an identifier of a UE that may be included in the ResumeRequest when a state transition to RRC_CONNECTED is made. It has a 40-bit length.
2. The second UE identifier: an identifier of a UE that may be included in the Resume Request when a state transition to RRC_CONNECTED is made. It has a 24-bit length.
3. ran-Paging Cycle: Paging cycle to be applied in RRC_INACTIVE state.
4. ran-Notification AreaInfo: Configuration information of a ran-Notification Area consisting of a list of cells and the like. UE initiates a resume procedure when the ran_Notification Area is changed.
5. t380: Timer related to the periodic resumption procedure.
6. NextHopChangingCount (NCC): Counter used to derive new security keys after performing the resume procedure.
7. sdt-Config: Configuration information for SDT.

In step 2A-14, UE performs the SuspendConfig operation set. The SuspendConfig operation set is applied at a predetermined time point. For the SuspendConfig operation set, the following operations are sequentially performed.

<SuspendConfig Operation Set>
1: resetting MAC and releasing the default MAC Cell Group configuration, if any.
2: applying the received suspendConfig except the received nextHopChainingCount and received sdt-Config.
3: determining DRB to be configured for SDT based on the sdt-DRB-List.
4: determining whether SRB2 to be configured for SDT based on sdt-DRB2-Indication.
5: determining that SRB1 is configured for SDT based on that sdt-Config is included in the SuspendConfig (or based on that either the sdt-DRB-List or sdt-DRB2-Indication or both are included in the sdt-Config).
6: re-establishing RLC entity of SRB2.
7: performing SDU discard for the PDCP entity of SRB1.
8: performing SDU discard for the PDCP entity of SRB2, if SRB2 is configured for SDT.
9: re-establishing RLC entity of SRB1.
10: storing in UE Inactive AS Context the nextHopChainingCount received in the RRCRelease message, the current security keys, the EHC state, the C-RNTI used in the source PCell, PDCP configurations of radio bearers configured for SDT, RLC configurations of radio bearers configured for SDT, logical channel configurations of radio bearers configured SDT, PDCP configurations of radio bearers not configured for SDT, RLC configurations of radio bearers not configured for SDT, logical channel configurations of radio bearers not configured SDT etc
11: suspending all radio bearers configured for SDT.
12: suspending all radio bearers not configured for SDT.
13: entering RRC_INACTIVE and performing cell selection.

The predefined time point is as follows.

Earlier time point between a time point at which 100 ms has elapsed since receiving the RRCRelease message and a time point at which the lower layer successfully acknowledged the reception of the RRCRelease message.

In step 2A-15, UE selects a second cell of a second base station as a consequence of cell selection. UE may compare the radio signal quality of the serving cell and the neighboring cell to reselect the neighboring cell having a better radio signal quality. Alternatively, a cell in which the radio signal quality is greater than or equal to a certain threshold may be selected. The first cell and the second cell can be same or different. The first base station and the second base station can be same or different.

In steps 2A-17, UE receives system information including SIB1 in the second cell.

In step 2A-19, an event that triggers the resume procedure occurs. When the upper layer or AS requests the resumption of the suspended RRC connection or when new data occurs, the resume procedure may be triggered.

UE determines if SDT can be triggered and which SDT between RA-SDT and CG-SDT is to be triggered.

UE initiates the resume procedure for SDT when all of the following conditions are fulfilled.
1: the upper layers request resumption of RRC connection and
2: SIB1 includes sdt-ConfigCommon and
3: sdt-Config is configured and
4: all the pending data in UL is mapped to the radio bearers configured for SDT and
5: the data volume of the pending UL data across all RBs configured for SDT is less than or equal to sdt-DataVolumeThreshold and
6: the RSRP of the downlink pathloss reference is higher than sdt-RSRP-Threshold.

UE determines to initiate CG-SDT when following conditions are fulfilled.
1: CG-SDT is configured on the selected UL carrier, and TA of the configured grant Type 1 resource is valid and
2: at least one SSB configured for CG-SDT with SS-RSRP above cg-SDT-RSRP-ThresholdSSB is available.

CG-SDT is released when time alignment timer expires or UE selects or reselects a cell that is different from the cell where CG-SDT is configured.

UE determines to initiate RA-SDT when following conditions are fulfilled.
1: CG-SDT is not initiated and
2: at least one set of Random Access resources for RA-SDT are available in the selected uplink carrier.

A set of Random Access resources corresponds to a RACH-ConfigCommon or a RACH-ConfigCommon-fc.

UE determines a Random Access resource set of a RACH-ConfigCommon-fc is available for RA-SDT if the RACH-ConfigCommon-fc is associated with SDT and not associated with RedCap and CovEng. UE selects the RACH-ConfigCommon-fc for RA-SDT.

UE determines a Random Access resource set of a RACH-ConfigCommon is available for RA-SDT if no RACH-ConfigCommon-fc is available for RA-SDT. UE selects the default RACH-ConfigCommon for RA-SDT.

UE selects a RACH-ConfigCommon corresponding to the Random Access resource set available for RA-SDT.

In step 2A-23, UE performs SDT preliminary operation if RA-SDT procedure or CG-SDT procedure is initiated.
/Start of SDT Preliminary Operation/
UE applies to SRB1 the first predefined PDCP configuration and the first predefined RLC configuration and the first predefined logical channel configuration1 and the first predefined logical channel configuration2.

UE applies a first predefined BSR configuration and a first predefined PHR configuration.

UE applies the timeAlignmentTimerCommon included in SIB1

UE restores from UE Inactive AS Context the nextHop-ChainingCount received in the RRCRelease message, the current security keys and the EHC state.

UE sets the resumeMAC-I to the 16 least significant bits of the MAC-I calculated based on the restored security keys.

UE derives new security keys based on the nextHop-ChainingCount.

UE configures lower layers to apply security protections for all radio bearers except SRB0 based on the new security keys.

UE re-establishes PDCP entity for SRB1.

UE resumes SRB1.

UE restores from UE Inactive AS Context, PDCP configurations and RLC configurations of radio bearers in the second radio bearer group.

UE restores from UE Inactive AS Context, stored logical channel configuration2 of radio bearers in the third radio bearer group.

UE applies to SRB2 a second logical channel configuration1 and a first predefined logical channel configuration2.

UE applies to radio bearers in the third radio bearer group a third predefined logical channel configuration1.

UE re-establishes PDCP entities for radio bearers in the second radio bearer group without triggering PDCP status report.

UE resumes radio bearers configured in the second radio bearer group.
/End of SDT Preliminary Operation/

By performing SDT preliminary operation, UE makes the radio bearers configured for SDT ready for data reception and transmission.

As a consequence of above operations, following configurations are applied to each radio bearer configured for SDT. Since PDCP entity and RLC entity locates in the central unit, stored configurations for PDCP and RLC can be applied to SRB2 and DRBs. MAC entity locates in the distributed unit. MAC entity may not know UE performing SDT. predefined configuration for MAC is applied to SRB1 and SRB2 and DRBs.

TABLE 5

|  | a first SRB configured for SDT; SRB1 | a second SRB configured for SDT; SRB2 | DRBs configured for SDT; DRBs in sdt-DRB-List |
|---|---|---|---|
| PDCP configuration | a first predefined PDCP configuration | stored PDCP configuration of SRB2 | stored PDCP configuration of corresponding DRB |
| RLC configuration | a first predefined RLC configuration | stored RLC configuration of SRB2 | stored RLC configuration of corresponding DRB |

TABLE 5-continued

|  | a first SRB configured for SDT; SRB1 | a second SRB configured for SDT; SRB2 | DRBs configured for SDT; DRBs in sdt-DRB-List |
|---|---|---|---|
| logical channel configuration1 (priority, PBR, LCG, remaining LCP restrictions) | a first predefined logical channel configuration1 | a second predefined logical channel configuration1 | a third predefined logical channel configuration1 |
| logical channel configuration2 (CG related LCP restrictions) | a first predefined logical channel configuration2 | a first predefined logical channel configuration2 | stored logical channel configuration2 of corresponding DRB/logical channel |

Various predefined configurations are explained in the table below.

TABLE 6

| | |
|---|---|
| the first predefined PDCP configuration | t-Reordering = infinity, pdcp-SN-SizeDL = len12bits, pdcp-SN-SizeUL = len12bits, moreThanOneRLC = absent |
| the first predefined RLC configuration | sn-FieldLength = size12, t-PollRetransmit = ms45, pollByte = infinity, t-Reassembly = ms35 |
| the first predefined logical channel configuration1 | priority = 1, prioritisedBitRate = infinity, logicalChannelGroup = 0, allowedServingCells = absent/not-configured, allowedSCS-List = absent/not-configured, maxPUSCH-Duration = absent/not-configured. |
| the second predefined logical channel configuration1 | priority = 2, prioritisedBitRate = infinity, logicalChannelGroup = 0, allowedServingCells = absent/not-configured, allowedSCS-List = absent/not-configured, maxPUSCH-Duration = absent/not-configured |
| the third predefined logical channel configuration1 | priority = 3, prioritisedBitRate = kBps0, logicalChannelGroup = 1, allowedServingCells = absent/not-configured, allowedSCS-List = absent/not-configured, maxPUSCH-Duration = absent/not-configured |
| the first predefined logical channel configuration2 | configuredGrantType1Allowed = true, allowedCG-List = absent |
| first predefined BSR configuration | periodicBSR-Timer = sf10, retxBSR-Timer = sf80 |
| first predefined PHR configuration | phr-PeriodicTimer = sf10, phr-ProhibitTimer = sf10, multiplePHR = false, phr-Type2OtherCell = false |

AllowedCG-List indicates which configured grant is applicable to this logical channel. If present, UL MAC SDUs from this logical channel can only be mapped to the indicated configured grant configuration. If the field is not present, UL MAC SDUs from this logical channel can be mapped to any configured grant configurations.

AllowedSCS-List indicates which SCS is applicable to this logical channel. If present, UL MAC SDUs from this logical channel can only be mapped to the indicated numerology. Otherwise, UL MAC SDUs from this logical channel can be mapped to any configured numerology.

AllowedServingCells indicates which serving cell is applicable to this logical channel. If present, UL MAC SDUs from this logical channel can only be mapped to the serving cells indicated in this list. Otherwise, UL MAC SDUs from this logical channel can be mapped to any configured serving cell of this cell group.

ConfiguredGrantType1Allowed indicates whether type1 configured grant is applicable to this logical channel. If present, UL MAC SDUs from this logical channel can be transmitted on a configured grant type 1. Otherwise, UL MAC SDUs from this logical channel cannot be transmitted on a configured grant type 1.

MaxPUSCH-Duration indicates which PUSCH duration is applicable to this logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration.

Priority is Logical channel priority. lower value indicates higher priority. logical channel with higher priority is allowed with more resource than logical channel with lower priority.

PrioritisedBitRate indicates prioritized data rate of the logical channel. Value kBps0 corresponds to 0 kiloBytes/s, LogicalChannelGroup is ID of the logical channel group which the logical channel belongs to.

The priority value in the first predefined logical channel configuration1 is lower than the priority value in the second predefined logical channel configuration1. The priority value in the second predefined logical channel configuration1 is lower than the priority value in the third predefined logical channel configuration1.

The prioritisedBitRate value in the first predefined logical channel configuration1 is equal to the prioritisedBitRate value in the second predefined logical channel configuration1. The prioritisedBitRate value in the second predefined logical channel configuration1 is greater than the prioritisedBitRate value in the third predefined logical channel configuration1.

The logicalChannelGroup value in the first predefined logical channel configuration1 is equal to the logicalChannelGroup value in the second predefined logical channel configuration1. The logicalChannelGroup value in the second predefined logical channel configuration1 is different from the logicalChannelGroup value in the third predefined logical channel configuration1.

PeriodicBSR-Timer indicates value in number of subframes for periodic BSR reporting. Value sf10 corresponds to 10 subframe.

RetxBSR-Timer indicates value in number of subframes for BSR retransmission. Value sf80 corresponds to 80 subframes.

PHR-PeriodicTimer indicates value in number of subframes for periodic PHR reporting. Value sf10 corresponds to 10 subframes.

PHR-ProhibitTimer indicates value in number of subframes for PHR reporting prohibition. Value sf80 corresponds to 80 subframes.

MultiplePHR indicates if power headroom shall be reported using the Single Entry PHR MAC control element or Multiple Entry PHR MAC control element. True means to use Multiple Entry PHR MAC control element and False means to use the Single Entry PHR MAC control element PHR-Type2OtherCell indicates whether UE shall report a PHR type 2 for the SpCell of the other MAC entity. If set to false, UE shall not report a PHR type 2 for the SpCell of the other MAC entity.

In step 2A-25, UE performs RA-SDT operation if RA-SDT is initiated and CG-SDT operation if CG-SDT procedure is initiated.

<RA-SDT Operation>

UE performs RA-SDT procedure as follows.

UE first perform initial PUSCH transmission and then performs subsequent transmission.

The initial PUSCH transmission for RA-SDT is performed as follows.

/Start of Initial PUSCH Transmission for RA-SDT/

UE selects, based at least in part on rsrp-ThresholdSSB-SUL indicated in a default RACH-ConfigCommon of a specific uplink, an uplink where RA-SDT is to be performed. The specific uplink is NUL.

If the RSRP of the downlink pathloss reference is less than rsrp-ThresholdSSB-SUL, UE select the NUL carrier for performing RA-SDT.

If the RSRP of the downlink pathloss reference is greater than or equal to rsrp-ThresholdSSB-SUL, UE select the SUL carrier for performing RA-SDT.

The downlink pathloss reference could be a SSB with the best RSRP among the SSBs of the cell. It could be any SSB of the cell.

UE selects for RA-SDT a RACH-ConfigCommon from a default RACH-ConfigCommon and zero or one or more of RACH-ConfigCommon-fc of the selected uplink carrier.

UE selects a SSB based at least in part on a rsrp-ThresholdSSB.

UE uses the rsrp-ThresholdSSB of the selected RACH-ConfigCommon of the selected uplink carrier. For example, if the default RACH-ConfigCommon of SUL is selected, UE applies the rsrp-ThresholdSSB of the default RACH-ConfigCommon of SUL. If the n-th RACH-ConfigCommon-fc of NUL is selected, UE applies the rsrp-ThresholdSSB in the n-th RACH-ConfigCommon-fc of NUL.

UE selects preamble group based at least in part on the selected RACH-ConfigCommon of the selected uplink carrier.

64 preambles are defined in total. They can be divided into two groups. UE having large data and being in a good channel condition can select Preamble Group B so that GNB can allocate bigger UL grant. UE having smaller data or being in a bad channel condition can select Preamble Group A so that GNB can allocate normal UL grant.

If the potential Msg3 size (UL data available for transmission plus MAC subheader(s) and, where required, MAC CEs) is greater than ra-Msg3SizeGroupA and the pathloss is less than PCMAX (of the Serving Cell the RA-SDT is performed)–preambleReceivedTargetPower–msg3-DeltaPreamble–messagePowerOffsetGroupB, UE select the Random Access Preamble group B. Otherwise UE selects the Random Access Preamble group A.

One msg3-DeltaPreamble may be included in the PUSCH-ConfigCommon, and one msg3-DeltaPreamble can be included in each RACH-ConfigCommon-fc.

If the default RACH-ConfigCommon of a uplink carrier is selected for RA-SDT, UE selects a random access preamble group using msg3-DeltaPreamble of PUSCH-ConfigCommon of the selected uplink carrier and Msg3SizeGroupA, preambleReceivedTargetPower and messagePowerOffsetGroupB of the default RACH-ConfigCommon of the selected uplink carrier. If msg3-DeltaPreamble is not included in PUSCH-ConfigCommon, UE uses 0.

If the n-th RACH-ConfigCommon-fc of a uplink carrier is selected for RA-SDT, UE selects a random access preamble group using msg3-DeltaPreamble and Msg3SizeGroupA and preambleReceivedTargetPower and messagePowerOffsetGroupB included in the n-th RACH-ConfigCommon-fc of the selected uplink carrier. If msg3-DeltaPreamble is not included in the n-th RACH-ConfigCommon-fc of the selected uplink carrier, UE uses msg3-DeltaPreamble of PUSCH-ConfigCommon of the selected uplink carrier.

UE select a preamble randomly with equal probability from the preambles associated with the selected SSB from the selected preamble group. UE sets the PREAMBLE_INDEX to a ra-PreambleIndex corresponding to the selected preamble.

UE determines the next available PRACH occasion from the PRACH occasions corresponding to the selected SSB. UE shall select a PRACH occasion randomly with equal probability amongst the consecutive PRACH occasions indicated by PRACH configuration index of the selected RACH-ConfigCommon of a specific BWP of the selected uplink carrier. The specific BWP is initial uplink BWP.

UE transmits the selected preamble in the selected PRACH occasion in the selected uplink.

UE sets PREAMBLE_RECEIVED_TARGET_POWER to preambleReceivedTargetPower+DELTA_PREAMBLE+(PREAMBLE_POWER_RAMPING_COUNTER−1)×powerRampingStep+POWER_OFFSET_2STEP_RA.

UE sets the transmission power of the preamble to the sum of PREAMBLE_RECEIVED_TARGET_POWER and the pathloss of DL pathloss reference.

If the default RACH-ConfigCommon of a uplink carrier is selected for RA-SDT, UE uses the preambleReceivedTargetPower and powerRampingStep of the default RACH-ConfigCommon of the selected uplink carrier. UE sets POWER_OFFSET_2STEP_RA to 0. UE sets DELTA_PREAMBLE according to the preamble format determined from the prach-ConfigurationIndex indicated in the default RACH-ConfigCommon of the selected uplink carrier. DELTA_PREAMBLE is predefined for each preamble format. PREAMBLE_POWER_RAMPING_COUNTER is initialized to 1 and increases by 1 for each preamble transmission.

If n-th RACH-ConfigCommon-fc of a uplink carrier is selected for RA-SDT, UE uses the preambleReceivedTargetPower and powerRampingStep of the n-th RACH-ConfigCommon-fc of the selected uplink carrier. UE sets POWER_OFFSET_2STEP_RA to 0. UE sets DELTA_PREAMBLE according to the preamble format determined from the prach-ConfigurationIndex indicated in the n-th RACH-ConfigCommon-fc of the selected uplink carrier. DELTA_PREAMBLE is predefined for each preamble format. PREAMBLE_POWER_RAMPING_COUNTER is initialized to 1 and increases by 1 for each preamble transmission.

UE receives RAR including an uplink grant.

To receive RAR, UE start the ra-ResponseWindow configured by RACH-ConfigCommon at the first PDCCH occasion from the end of the Random Access Preamble transmission. UE monitors the PDCCH of the SpCell for Random Access Response(s) identified by the RA-RNTI while the ra-ResponseWindow is running.

In monitoring PDCCH, UE applies searchSpace indicated by ra-SearchSpace in PDCCH-ConfigCommon.

A set of PDCCH candidates for a UE to monitor is defined in terms of PDCCH search space sets. A search space set can be a CSS (Common Search Space) set or a USS (UE specific Search Space) set. A UE monitors PDCCH candidates in the search spaces set configured by a ra-SearchSpace in PDCCH-ConfigCommon.

UE consider Random Access Response reception is successful if the Random Access Response contains a MAC subPDU with Random Access Preamble identifier corresponding to the transmitted PREAMBLE_INDEX.

The MAC subPDU contains a MAC RAR. The MAC RAR includes fields like Timing Advance Command, Uplink Grant and Temporary C-RNTI. The Timing Advance Command field indicates the index value used to control the amount of timing adjustment that UE has to apply. The size of the Timing Advance Command field is 12 bits. UE adjusts the uplink transmission timing based on the Timing Advance Command field and starts the timeAlignmentTimer. The timeAlignmentTimer is set to timeAlignmentTimerCommon. The Uplink Grant field indicates the resources to be used on the uplink. The size of the UL Grant field is 27 bits. The Temporary C-RNTI field indicates the temporary identity that is used by UE during Random Access. The size of the Temporary C-RNTI field is 16 bits Uplink Grant field further includes PUSCH time resource allocation field. PUSCH time resource allocation field is 4 bit.

A single Pusch-TimeDomainAllocationList may be included in the PUSCH-ConfigCommon of a uplink carrier.

PUSCH time resource allocation field indicates a pusch-TimeDomainResourceAllocation of a pusch-TimeDomainResourceAllocationList in PUSCH-ConfigCommon of the selected uplink carrier (uplink where preamble is transmitted).

PUSCH time resource allocation field indicates an indexed row of a default PUSCH time domain resource allocation table illustrated in table below if PUSCH-ConfigCommon of the selected uplink carrier does not include the first pusch-TimeDomainResourceAllocationList.

TABLE 7

| Row index | $K_2$ | S | L |
|---|---|---|---|
| 1 | j | 0 | 14 |
| 2 | j | 0 | 12 |

TABLE 7-continued

| Row index | $K_2$ | S | L |
|---|---|---|---|
| 3 | j | 0 | 10 |
| 4 | j | 2 | 10 |
| 5 | j | 4 | 10 |
| 6 | j | 4 | 8 |
| 7 | j | 4 | 6 |
| 8 | j + 1 | 0 | 14 |
| 9 | j + 1 | 0 | 12 |
| 10 | j + 1 | 0 | 10 |
| 11 | j + 2 | 0 | 14 |
| 12 | j + 2 | 0 | 12 |
| 13 | j + 2 | 0 | 10 |
| 14 | j | 8 | 6 |
| 15 | j + 3 | 0 | 14 |
| 16 | j + 3 | 0 | 10 | j is a value specific to the PUSCH subcarrier spacing and is defined in the table below.

TABLE 8

| PUSCH subcarrier Spacing | j |
|---|---|
| 15 kHz | 1 |
| 30 kHz | 1 |
| 60 kHz | 2 |
| 120 kHz | 3 |

When UE transmits a PUSCH scheduled by RAR, the delta value specific to the PUSCH subcarrier spacing is applied in addition to the K2 value.

TABLE 9

| PUSCH subcarrier Spacing | delta |
|---|---|
| 15 kHz | 2 |
| 30 kHz | 3 |
| 60 kHz | 4 |
| 120 kHz | 6 |

UE determines K2 based at least in part on h; the value indicated in PUSCH time resource allocation field.

If PUSCH-ConfigCommon includes the pusch-TimeDomainResourceAllocationList, h indicates (h+1)th entry of pusch-TimeDomainResourceAllocationList. If PUSCH-ConfigCommon does not includes the pusch-TimeDomainResourceAllocationList, h indicates row index (h+1) of the default PUSCH time domain resource allocation table.

Each row of the default PUSCH time domain resource allocation table is associated with k2 which is a function of j. and i. UE determines j according to the PUSCH subcarrier spacing. UE determines i based at least in part on h. UE determines k2 by adding the determined j and determined i. In other words, UE determines k2 based at least in part on the j determined based at least in part on the PUSCH subcarrier spacing and the row index determined based at least in part on the h.

PUSCH subcarrier spacing is determined by a subcarrier spacing IE included in a BWP-UplinkCommon IE of the selected uplink carrier. If UE is in RRC_IDLE or RRC_INACTIVE, the BWP-UplinkCommon is indicated in SIB1 and is for the initial uplink BWP. If UE is in RRC_CONNECTED, the BWP-UplinkCommon is for the current active uplink BWP.

UE determines the time slot for PUSCH transmission scheduled by RAR. If a UE receives a PDSCH with a RAR message ending in slot n for a corresponding PRACH transmission from UE, UE transmits the PUSCH in slot (n+k2+delta). k2 and delta are subcarrier spacing specific and determined as below.

If pusch-TimeDomainResourceAllocationList is not included in PUSCH-ConfigCommon in ServingCellConfig-CommonSIB, k2 is determined based at least in part on h and j and i. j is determined based at least in part on subcarrier spacing IE included in BWP-UplinkCommon IE in ServingCellConfigCommonSIB. If subcarrier spacing IE indicates 15 kHz or 30 kHz, j is 1. If subcarrier spacing IE indicates 60 kHz, j is 2. If subcarrier spacing IE indicates 120 kHz, j is 3.

Delta is determined based at least in part on subcarrier spacing IE included in BWP-UplinkCommon IE in ServingCellConfigCommonSIB. If subcarrier spacing IE indicates 15 kHz, delta is 2. If subcarrier spacing IE indicates 30 kHz, delta is 3. If subcarrier spacing IE indicates 60 kHz, delta is 4. If subcarrier spacing IE indicates 120 kHz, delta is 6.

S is the symbol where PUSCH transmission starts. L is the length of PUSCH in number of symbols.

UE performs Msg 3 transmission at the determined slot according to the UL grant in the received RAR.

UE determines the PUSCH transmission power by summing offset, pathloss and other parameters related with number of PRBs and power control commands.

offset is sum of preambleReceivedTargetPower and msg3-DeltaPreamble.

If the default RACH-ConfigCommon of a uplink carrier is selected for RA-SDT, UE uses msg3-DeltaPreamble of PUSCH-ConfigCommon of the selected uplink carrier and preambleReceivedTargetPower of the default RACH-ConfigCommon of the selected uplink carrier.

If n-th RACH-ConfigCommon-fc of a uplink carrier is selected for RA-SDT, UE uses msg3-DeltaPreamble and preambleReceivedTargetPower included in the n-th RACH-ConfigCommon-fc of the selected uplink carrier.

UE generates a Msg3. If SDT is applied, the Msg3 (or the MAC PDU scheduled by RAR) includes a RRC message and a DRB data and a BSR and a PHR. The RRC message is not ciphered and the DRB data is ciphered by the security key derived from the security key stored in UE AS context. The RRC message is included in the first MAC SDU and the DRB data is included in the second MAC SDU. The first MAC SDU and the second MAC SDU consists of MAC subheader and MAC payload. The MAC payload of the second MAC SDU contains the DRB data (MAC SUD generated from the DRB of the third radio bearer group). The MAC subheader is not ciphered. The second MAC SDU is located after the first MAC SDU. The RRC message is RRCResumeRequest message. The RRC message is CCCH message. The BSR is included in the first MAC CE. The PHR is included in the second MAC CE. The first MAC CE is located after the second MAC SDU. The second MAC CE is located after the first MAC CE.

UE transmits the Msg3. UE starts contentionResolutionTimer. The timer is set by the value indicated in the selected RACH-ConfigCommon of the selected uplink carrier.

GNB receives the Msg3 and process RRC message included in Msg 3. If RRC message requests connection resumption, GNB performs call admission control and act upon the result. GNB processes the DRB data included in the Msg 3. GNB processes BSR and PHR included in the Msg 3.

LCG field in the BSR is determined based at least in part on the third predefined logical channel configuration1.

The format of PHR is determined based at least in part on the first predefined PHR format.

The BSR is cancelled when the UL grant in the RAR can accommodate all pending data available for transmission but is not sufficient to additionally accommodate the BSR MAC CE plus its subheader. The pending data available for transmission is data in PDCP entity and RLC entity and does not include MAC CE and its subheader.

The PHR is cancelled when there is an ongoing SDT procedure and the UL grant in the RAR can accommodate all pending data available for transmission and the BSR MAC CE plus itsubheader (if BSR is triggered and not cancelled) but is not sufficient to additionally accommodate the PHR MAC CE plus its subheader.

UE receives Msg 4 from the base station. Msg 4 includes a CR MAC CE.

UE receives a DCI in PDCCH addressed by a temporary C-RNTI based at least in part on ra-SearchSpace. The DCI includes a Time domain resource assignment field. The temporary C-RNTI is assigned to UE in the RAR To receives the DCI in PDCCH addressed by the temporary C-RNTI, UE applies searchSpace indicated by ra-SearchSpace. UE monitors PDCCH while the contentionResolutionTimer is running.

A single Pdsch-TimeDomainAllocationList may be included in the PDSCH-ConfigCommon.

If Pdsch-TimeDomainAllocationList is included in the PDSCH-ConfigCommon, UE determines the time domain relationship between the PDCCH and the PDSCH by using Pdsch-TimeDomainAllocationList of the PDSCH-ConfigCommon.

If Pdsch-TimeDomainAllocationList is not included in the PDSCH-ConfigCommon, UE determines the time domain relationship between the PDCCH and the PDSCH by using default PDSCH time domain resource allocation table.

PDSCH time resource allocation field indicates a pdsch-TimeDomainResourceAllocation of a pdsch-TimeDomainResourceAllocationList in PDSCH-ConfigCommon.

PDSCH time resource allocation field indicates an indexed row of a default PDSCH time domain resource allocation table illustrated in table x if PDSCH-ConfigCommon does not include the first pdsch-TimeDomainResourceAllocationList.

TABLE 10

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |

TABLE 10-continued

| Row index | dmrs-TypeA-Position | PDSCH mapping type | $K_0$ | S | L |
|---|---|---|---|---|---|
| 14 | 2, 3 | Type A | 0 | 2 | 4 |
| 15 | 2, 3 | Type B | 0 | 4 | 7 |
| 16 | 2, 3 | Type B | 0 | 8 | 4 |

UE determines K0 and S and L based at least in part on h; the value indicated in time resource assignment field.

If PDSCH-ConfigCommon includes the pdsch-TimeDomainResourceAllocationList, h indicates (h+1)th entry of the pdsch-TimeDomainResourceAllocationList.

Each entry of pdsch-TimeDomainResourceAllocationList (or each pdsch-TimeDomainResourceAllocation of pdsch-TimeDomainResourceAllocationList) is associated with K0 and S and L. UE determines K0 and S and L for the PDSCH reception by the K0 and S and L associated with the pdsch-TimeDomainResourceAllocation which is indicated by h.

If PDSCH-ConfigCommon does not includes the pdsch-TimeDomainResourceAllocationList, h indicates row index (h+1) of the default PDSCH time domain resource allocation table.

UE stops ra-ContentionResolutionTimer if a MAC PDU is received based at least in part on the ra-SearchSpace and Temporary C-RNTI and if the MAC PDU is successfully decoded.

If the MAC PDU contains a UE Contention Resolution Identity MAC CE and if UE Contention Resolution Identity in the MAC CE matches the CCCH SDU (i.e. RRCResumeRequest) transmitted in Msg3, UE consider this Contention Resolution successful and set the C-RNTI to the value of the TEMPORARY_C-RNTI (i.e. Temporary C-RNTI allocated in RAR becomes the C-RNTI of UE);

Upon successful contention resolution, UE starts subsequent transmission for RA-SDT.

/End of Initial PUSCH Transmission for RA-SDT/

Subsequent transmission for RA-SDT is as below.

UE monitors PDCCH addressed by C-RNTI based at least in part on sdt-SearchSpace if sdt-SearchSpace is configured in sdt-ConfigCommon.

UE monitors PDCCH addressed by C-RNTI based at least in part on ra-SearchSpace if sdt-SearchSpace is not configured in sdt-ConfigCommon.

The first uplink carrier is the uplink carrier selected for the latest preamble transmission or the uplink carrier selected for the initial PUSCH transmission for RA-SDT or the uplink carrier where initial PUSCH transmission for RA-SDT was performed. Upon receiving DCI including uplink grant, UE determines time domain relationship between the PDCCH and the PUSCH based at least in part on pusch-TimeDomainResourceAllocationList in PUSCH-ConfigCommon of the first uplink carrier (if pusch-TimeDomainResourceAllocationList is include in PUSCH-ConfigCommon of the first uplink carrier) or default PUSCH time domain resource allocation table (if pusch-TimeDomainResourceAllocationList is not included in PUSCH-ConfigCommon of the first uplink carrier), If msg3-DeltaPreamble is not included in PUSCH-ConfigCommon of the first uplink carrier and if the default RACH-Configcommon is selected for RA-SDT, UE determines uplink transmission power of PUSCH at least in part on preambleReceivedTargetPower in the default RACH-ConfigCommon of the first uplink carrier.

If msg3-DeltaPreamble is not included in PUSCH-ConfigCommon of the first uplink carrier, if msg3-DeltaPreamble is not included in the selected RACH-ConfigCommon-fc of the first uplink carrier and if a RACH-ConfigCommon-fc is selected for RA-SDT, UE determines uplink transmission power of PUSCH at least in part on preambleReceivedTargetPower in the selected RACH-ConfigCommon-fc of the first uplink carrier.

If msg3-DeltaPreamble is included in PUSCH-ConfigCommon of the first uplink carrier and if the default RACH-Configcommon is selected for RA-SDT, UE determines uplink transmission power of PUSCH at least in part on preambleReceivedTargetPower in the default RACH-ConfigCommon of the first uplink carrier and msg3-DeltaPreamble in PUSCH-ConfigCommon of the first uplink carrier.

If msg3-DeltaPreamble is included in the selected RACH-ConfigCommon-fc of the first uplink carrier and if a RACH-ConfigCommon-fc is selected for RA-SDT, UE determines uplink transmission power of PUSCH at least in part on preambleReceivedTargetPower and msg3-DeltaPreamble in the selected RACH-ConfigCommon-fc of the first uplink carrier.

UE determines the PUSCH transmission power by summing offset, pathloss and other parameters related with number of PRBs and power control commands.

offset is sum of preambleReceivedTargetPower and msg3-DeltaPreamble.

UE performs PUSCH transmission based at least in part on the transmission power and time domain relationship determined above.

Upon receiving DCI including downlink assignment, UE determines time domain relationship between the PDCCH and the PDSCH based at least in part on X If pdsch-TimeDomainResourceAllocationList is include in PDSCH-ConfigCommon, X is pdsch-TimeDomainResourceAllocationList in PDSCH-ConfigCommon.

If pdsch-TimeDomainResourceAllocationList is not included in PUSCH-ConfigCommon, X is default PDSCH time domain resource allocation table.

Time domain relationship between the PDCCH and the PDSCH is indicated by (or associated with) the subframe for the PDSCH and the starting symbol of the PDSCH and the number of symbols of the PDSCH.

UE receives PDSCH based at least in part on the time domain relationship determined above.

During the subsequent transmission for RA-SDT, UE starts and restarts inactivityTimer upon receiving MAC SDU or transmitting MAC SDU.

When inactivityTimer expires UE performs the actions upon going to RRC_IDLE.

The inactivityTimer is configured by the RRCRelease received in the first cell.

During the subsequent transmission for RA-SDT, UE restarts monitoringTimer upon receiving a monitoringTimer MAC CE.

The MAC CE consists of only MAC subheader. The MAC subheader consists of two R bits and a LCID field and a eLCID field.

monitoringTimer starts when RA-SDT procedure is initiated.

monitoringTimer stops when RRCRelease message is received.

The monitoringtimer is configured by SIB1 received in the second cell.

UE performs CG-SDT procedure as follows.

UE first perform initial PUSCH transmission and then performs subsequent transmission.

The initial PUSCH transmission for CG-SDT is performed as below.

/Start/

UE generates a MAC PDU for the initial PUSCH transmission for CG-SDT. The MAC PDU for the initial PUSCH transmission includes a RRC message and a DRB data and a BSR and a PHR. The RRC message is not ciphered and the DRB data is ciphered by the security key stored in UE AS context. The RRC message is included in the first MAC SDU and the DRB data is included in the second MAC SDU. The first MAC SDU and the second MAC SDU consists of MAC subheader and MAC payload. The MAC payload of the second MAC SDU contains the DRB data. The MAC subheader is not ciphered. The second MAC SDU is located after the first MAC SDU. The RRC message is RRCResumeRequest message. The RRC message is CCCH message. The BSR is included in the first MAC CE. The PHR is included in the second MAC CE. The first MAC CE is located after the second MAC SDU. The second MAC CE is located after the first MAC CE.

UE transmits the MAC PDU and starts cg-SDT-RetransmissionTimer and configuredGrantTimer. The timers are set by the value indicated in the cg-SDT-RetransmissionTimer and the configuredGrantTimer in BWP-Uplink-Dedicated-SDT of selected uplink in sdt-Config in RRCRelease respectively.

LCG field in the BSR is determined based at least in part on the third predefined logical channel configuration1.

The format of PHR is determined based at least in part on the first predefined PHR format.

The BSR is cancelled when the configured grant can accommodate all pending data available for transmission but is not sufficient to additionally accommodate the BSR MAC CE plus its subheader. The pending data available for transmission is data in PDCP entity and RLC entity and does not include MAC CE and its subheader.

The PHR is cancelled when there is an ongoing SDT procedure and the configured uplink grant can accommodate all pending data available for transmission and the BSR MAC CE plus itsubheader (if BSR is triggered and not cancelled) but is not sufficient to additionally accommodate the PHR MAC CE plus its subheader.

configuredGrantTimer is to control initial PUSCH transmission for SDT. configuredGrantTimer starts upon initial transmission on the configured grant. configuredGrantTimer is per HARQ-process. configuredGrantTimer stops when the first downlink assignment after initial transmission for CG-SDT with CCCH message is received. When configuredGrantTimer expires, SDT procedure is considered failed and UE performs the actions upon going to RRC_IDLE.

CG-SDT-RetransmissionTimer is to control retransmission during the initial PUSCH transmission for SDT. cg-SDT-RetransmissionTimer starts when the configured uplink grant is used for the retransmission of the initial transmission of the CG-SDT with CCCH message. During when the cg-SDT-RetransmissionTimer is running, retransmission is triggered in the configured grant.

After transmitting the MAC PDU for initial PUSCH transmission, UE monitors PDCCH addressed by C-RNTI based at least in part on sdt-cg-SearchSpace (if configured) or sdt-SearchSpace (if sdt-cg-SearchSpace is not configured).

If a downlink assignment has been received on the PDCCH for the C-RNTI, and if this is the first downlink assignment after initial transmission for CG-SDT with CCCH message, UE stops the cg-SDT-RetransmissionTimer and configuredGrantTimer for the corresponding HARQ process for initial transmission with CCCH message, to which initial PUSCH transmission for CG-SDT successfully completes.

UE determines time domain relationship between the PDCCH and the PDSCH based at least in part on Y.

If pdsch-TimeDomainResourceAllocationList is include in PDSCH-Config in BWP-Downlink-Dedicated-SDT in RRCRelease received in the first cell, Y is pdsch-TimeDomainResourceAllocationList in PDSCH-Config If pdsch-TimeDomainResourceAllocationList is not include in PDSCH-Config in BWP-Downlink-Dedicated-SDT in RRCRelease received in the first cell and if pdsch-TimeDomainResourceAllocationList is include in PDSCH-ConfigCommon in SIB1 of the second cell, Y is pdsch-TimeDomainResourceAllocationList in PDSCH-ConfigCommon.

If pdsch-TimeDomainResourceAllocationList is not include in PDSCH-Config in BWP-Downlink-Dedicated-SDT in RRCRelease received in the first cell and if pdsch-TimeDomainResourceAllocationList is not include in PDSCH-ConfigCommon in SIB1 of the second cell, Y is default PDSCH time domain resource allocation table.

UE monitors PDCCH addressed by C-RNTI and CS-RNTI based at least in part on sdt-cg-SearchSpace.

Upon receiving DCI including uplink grant, UE determines time domain relationship between the PDCCH and the PUSCH based at least in part on Z.

If pusch-TimeDomainResourceAllocationList is include in PUSCH-Config in BWP-Uplink-Dedicated-SDT of the selected uplink carrier in RRCRelease received in the first cell, Z is pusch-TimeDomainResourceAllocationList in PUSCH-Config.

If pusch-TimeDomainResourceAllocationList is not included in PUSCH-ConfigCommon in SIB1 received in the second cell and pusch-TimeDomainResourceAllocationList is not included in PUSCH-Config in BWP-Uplink-Dedicated-SDT of the selected uplink carrier in RRCRelease received in the second cell, Z is default PUSCH time domain resource allocation table.

UE determines uplink transmission power of PUSCH at least in part on W.

If sdt-P0-PUSCH and sdt-Alpha are included in CG-SDT-Configuration in BWP-Uplink-Dedicated-SDT of the selected uplink carrier in RRCRelease, W is sdt-P0-PUSCH and sdt-Alpha in CG-SDT-Configuration in BWP-Uplink-Dedicated-SDT of the selected uplink carrier in RRCRelease.

If sdt-P0-PUSCH and sdt-Alpha are not included in CG-SDT-Configuration in BWP-Uplink-Dedicated-SDT of the selected uplink carrier in RRCRelease, W is P0-PUSCH and Alpha in PUSCH-Config in BWP-Uplink-Dedicated-SDT of the selected uplink carrier in RRCRelease.

UE determines the PUSCH transmission power by summing offset, pathloss and other parameters related with number of PRBs and power control commands. offset is sum of P0-PUSCH and Alpha or sum of sdt-P0-PUSCH and sdt-Alpha.

UE performs PUSCH transmission based at least in part on the transmission power and time domain relationship determined above.

UE determines time domain relationship between the PDCCH and the PDSCH based at least in part on XX.

If pdsch-TimeDomainResourceAllocationList is include in PDSCH-Config in BWP-Downlink-Dedicated-SDT in RRCRelease received in the first cell, XX is pdsch-TimeDomainResourceAllocationList in PDSCH-Config.

If pdsch-TimeDomainResourceAllocationList is not include in PDSCH-Config in BWP-Downlink-Dedicated-SDT in RRCRelease received in the first cell and if pdsch-TimeDomainResourceAllocationList is include in PDSCH-ConfigCommon in SIB1 of the second cell, XX is pdsch-TimeDomainResourceAllocationList in PDSCH-ConfigCommon.

If pdsch-TimeDomainResourceAllocationList is not include in PDSCH-Config in BWP-Downlink-Dedicated-SDT in RRCRelease received in the first cell and if pdsch-TimeDomainResourceAllocationList is not include in PDSCH-ConfigCommon in SIB1 of the second cell, XX is default PDSCH time domain resource allocation table.

During the subsequent transmission for RA-SDT, UE starts and restarts inactivityTimer upon receiving MAC SDU or transmitting MAC SDU. When inactivityTimer expires UE performs the actions upon going to RRC_IDLE.

The inactivityTimer is configured by the RRCRelease received in the first cell.

During the subsequent transmission for CG-SDT, UE restarts monitoringTimer upon receiving a monitoringTimer MAC CE. The MAC CE consists of only MAC subheader. The MAC subheader consists of two R bits and a LCID field and a eLCID field.

monitoringTimer starts when CG-SDT procedure is initiated.

monitoringTimer stops when RRCRelease message is received.

The monitoringtimer is configured by SIB1 received in the second cell. 2A-27 SDT fallback operation In step 2A-27, UE performs SDT fallback operation if data appears in a buffer of any radio bearer not enabled for (or not configured for) SDT.

<SDT Fallback Operation>
/start/
UE initiates transmission of the UEAssistanceInformation message to provide nonSDT-DataIndication if data and/or signalling mapped to radio bearers not configured for SDT becomes available during SDT.

UE transmits UEAssistanceInformation including nonSDT-DataIndication via SRB1.

If RA-SDT is ongoing, UE performs transmission of UEAssistanceInformation based on C-RNTI and sdt-SearchSpace.

If CG-SDT is ongoing, UE performs transmission of UEAssistanceInformation based on C-RNTI and CS-RNTI and cg-sdt-SearchSpace.

nonSDT-DataIndication includes a IE indicating the cause of data being available in the radio bearers not configured for SDT.

The IE indicates one of following values when the IE is included in the UEAssistanceInformation: emergency, highPriorityAccess, mo-Signalling, mo-Data, mo-VoiceCall, mo-VideoCall, mo-SMS, mps-PriorityAccess, mcs-PriorityAccess.

The IE indicates one of following values when the IE is included in the RRCResumeRequest: emergency, highPriorityAccess, mt-Access, mo-Signalling, mo-Data, mo-VoiceCall, mo-VideoCall, mo-SMS, ma-Update, mps-PriorityAccess, mcs-PriorityAccess.

That is, if the IE is included in the UEAssistanceInformation, mt-Access and ma-Update are not used.

UE monitors PDCCH based at least in part on sdt-SearchSpace or sdt-cg-SearchSpace for reception of RRCResume.

UE receives RRCResume message and finishes the fallback operation.
/End/

SIB1 includes ServingCellConfigCommonSIB. ServingCellConfigCommonSIB includes one DownlinkConfigCommonSIB and two UplinkConfigCommonSIBs. One UplinkConfigCommonSIB is for a NUL (normal uplink) and the other UplinkConfigCommonSIB is for a SUL (supplementary uplink). UplinkConfigCommonSIB for a SUL is located after UplinkConfigCommonSIB is a NUL.

DownlinkConfigCommonSIB includes FrequencyInfoDL-SIB and BWP-DownlinkCommon. BWP-DownlinkCommon is for the initial DL BWP and includes PDCCH-ConfigCommon and PDSCH-ConfigCommon.

UplinkConfigCommonSIB includes FrequencyInfoUL-SIB and TimeAlignmentTimer and BWP-UplinkCommon. BWP-UplinkCommon is for the initial UL BWP. BWP-UplinkCommon includes RACH-ConfigCommon and PUSCH-ConfigCommon and PUCCH-ConfigCommon and a plurality of RACH-ConfigCommon-fc.

DownlinkConfigCommonSIB is a common downlink configuration of the serving cell. It consists of subfields such as FrequencyInfoDL-SIB and BWP-DownlinkCommon.

FrequencyInfoDL-SIB is a basic parameter of a downlink carrier. It consists of subfields such as a frequency band list and carrier bandwidth for each SCS.

BWP-DownlinkCommon is the configuration of the second downlink IBWP. It consists of subfields such as BWP, PDCCH-ConfigCommon, and PDSCH-ConfigCommon. The first IBWP has a frequency domain corresponding to the first CORESET #0 of the MIB and has subcarrier spacing indicated by the MIB. The first IBWP is the IBWP indicated by the MIB and receiving SIB1, the second IBWP is the IBWP indicated by the SIB1 and receiving the SIB2, paging, random access response message, and the like.

BWP is IE that configures general parameters of BWP. It consists of subfields such as locationAndBandwidth indicating the bandwidth and location of the BWP, and subcarrierSpacing indicating the SCS of the BWP.

SIB1 also includes a sdt-ConfigCommonSIB field.

SDT-Config field includes a SDT-Config IE. The SDT-Config IE includes following fields: a sdt-DRB-List, a sdt-SRB2-Indication, a sdt-MAC-PHY-CG-Config, a sdt-DRB-ContinueEHC.

SDT-DRB-ContinueEHC includes a IE indicating one of cell and ma. This field indicates whether the PDCP entity for the radio bearers configured for SDT continues or resets the EHC header compression protocol during PDCP re-establishment during SDT procedure. Value cell indicates that ROHC header compression continues when UE resumes for SDT in the same cell as the PCell when the RRCRelease message is received. Value ma indicates that EHC header compression continues when UE resumes for SDT in a cell belonging to the same RNA as the PCell when the RRCRelease message is received. If the field is absent PDCP entity for the radio bearers configured for SDT reset the EHC header compression protocol during PDCP re-establishment during SDT procedure.

SDT-DRB-List includes zero or one or more DRB-Identities. This field indicates the ID(s) of the DRB(s) that are configured for SDT. If size of the sequence is zero, then UE assumes that none of the DRBs are configured for SDT.

SDT-SRB2-Indication includes a IE indicating allowed. This field indicates whether SRB2 is configured for SDT or not. If the field is absent SRB2 is not configured for SDT.

SDT-MAC-PHY-CG-Config field includes a SDT-MAC-PHY-CG-Config IE. The SDT-MAC-PHY-CG-Config IE includes following fields: a cg-SDT-Config-LCH-restrictionToAddModList, a cg-SDT-Config-Initial-BWP-NUL, a cg-SDT-Config-Initial-BWP-SUL, a cg-SDT-Config-Initial-BWP-DL, a cg-SDT-TimeAlignmentTimer, a cg-SDT-RSRP-ThresholdSSB, a C-RNTI, a CS-RNTI.

CG-SDT-Config-LCH-restrictionToAddModList includes one or more CG-SDT-Config-LCH-restriction IEs. A CG-SDT-Config-LCH-restriction IE includes a logicalChannelIdentity field and a configuredGrantType1Allowed field. The CG-SDT-Config-LCH-restriction IE indicates whether the logical channel indicated by the logicalChannelIdentity field is allowed to use type1 configured grant or not.

CG-SDT-Config-Initial-BWP-NUL includes a BWP-Uplink-Dedicated-SDT IE.

CG-SDT-Config-Initial-BWP-SUL includes a BWP-Uplink-Dedicated-SDT IE.

The BWP-Uplink-Dedicated-SDT IE includes a PUSCH-Config IE and a ConfiguredGrantConfigToAddModList IE.

The PUSCH-Config IE is used to configure UE specific PUSCH parameters applicable to the initial BWP of the first cell.

The ConfiguredGrantConfigToAddModList IE includes one or more ConfiguredGrantConfigToAddMod IE.

CG-SDT-Config-Initial-BWP-DL includes a BWP-Downlink-Dedicated-SDT IE. The BWP-Downlink-Dedicated-SDT IE includes a PDCCH-Config IE and a PDSCH-Config IE.

The PDCCH-Config IE is used to configure UE specific PDCCH parameters applicable to the initial BWP of the first cell.

The PDSCH-Config IE is used to configure UE specific PDSCH parameters applicable to the initial BWP of the first cell.

CG-SDT-TimeAlignmentTimer includes a TimeAlignmentTimer IE. This field indicates TAT value for CG-SDT.

CG-SDT-RSRP-ThresholdSSB includes a RSRP-Range IE. This field indicates an RSRP threshold configured for SSB selection for CG-SDT.

C-RNTI includes a RNTI-value IE. This field indicates RNTI value for dynamic grant and dynamic assignment to be used during CG-SDT. C-RNTI indicated in this field is valid for dynamic grants in the normal uplink of the first cell and in the supplemental uplink of the first cell and for dynamic assignment in the downlink of the first cell.

CS-RNTI includes a RNTI-value IE. This field indicates RNTI value for type1 configured grant to be used during CG-SDT. CS-RNTI indicated in this field is valid for type1 configured grants in the normal uplink of the first cell and in the supplemental uplink of the first cell.

RNTI-value IE represents a Radio Network Temporary Identity. It indicates a integer between 0(=0000 0000 0000 0000) and 65535 (=1111 1111 1111 1111)

If SDT-Config without sdt-MAC-PHY-CG-Config is included in the RRCRelease, UE consider RA-SDT is configured. UE also consider RA-SDT is applicable in the third cell. The third cell is the cell where SIB1 including SDT-ConfigCommonSIB is broadcast.

If SDT-Config with sdt-MAC-PHY-CG-Config is included in the RRCRelease, UE consider CG-SDT is configured. UE also consider CG-SDT is applicable in the first cell and RA-SDT is applicable in the third cell. The first cell is the PCell when RRCRelease message including SDT-Config is received.

The sdt-ConfigCommonSIB field includes following fields: a sdt-RSRP-Threshold field and a sdt-DataVolume-Threshold field.

SDT-RSRP-Threshold indicates the RSRP threshold for UE to determine whether to perform SDT procedure.

SDT-DataVolumeThreshold indicates data volume threshold used to determine whether SDT can be initiated.

PDCCH-ConfigCommon is the cell-specific PDCCH parameters of the initial BWP of the second cell. It consists of subfields such as controlResourceSetZero, commonControlResourceSet, searchSpaceZero, commonSearchSpaceList, searchSpaceOtherSystemInformation, pagingSearchSpace, and ra-SearchSpace.

ControlResourceSetZero is defined as an integer between 0 and 15. It indicates one of the predefined CORESET #0 configurations. The controlResourceSetZero included in the MIB corresponds to the first CORESET #0, and the controlResourceSetZero included in the PDCCH-ConfigCommon of the servingCellConfigCommon of SIB1 corresponds to the second CORESET #0.

SearchSpaceZero is defined as an integer between 0 and 15. It indicates one of the predefined SS #0 configurations. The searchSpaceZero included in the MIB corresponds to the first SS #0, and the controlResourceSetZero included in the PDCCH-ConfigCommon of the servingCellConfigCommon of SIB1 corresponds to the second SS #0.

CommonControlResourceSet is a common CORESET defined by ControlResourceSet IE. It defines an additional CORESET that can be used for paging reception, random access response reception, system information reception, etc.

CommonSearchSpaceList is a list of common SSs. The common SS may be used for paging reception, random access response reception, system information reception, and the like.

SearchSpaceOtherSystemInformation is defined by the SS identifier IE. If it is 0, the second SS #0 is indicated, and if it is a value other than 0, one of the SSs defined in commonSearchSpaceList is indicated.

PagingSearchSpace is defined by the SS identifier IE. If it is 0, the second SS #0 is indicated, and if it is a value other than 0, one of the SSs defined in commonSearchSpaceList is indicated.

RA-SearchSpace is defined by the SS identifier IE. If it is 0, the second SS #0 is indicated. If it is a value other than 0, one of the SSs defined in the commonSearchSpaceList is indicated.

PDCCH-ConfigCommon configures one or more TYPE 1 CSSs (Common Search Space) and a TYPE2 CSS.

TYPE1 CSS is applicable to and used by both RRC_INACTIVE UE and RRC_IDLE UE. The configuration of TYPE1 CSS is predefined (if it is searchSpaceZero) or referred by one of commonSearchSpaceList. searchSpaceZero and searchSpaceOtherSystemInformation and pagingSearchSpace and ra-SearchSpace are TYPE1 CSS. CommonSearchSpaceList includes one or more SearchSpace IE.

TYPE2 CSS is applicable to and used by only RRC_INACTIVE UE. The type2 CSS is configured by a SearchSpace2 IE.

SDT-SearchSpace is TYPE2 CSS.

PDCCH-Config is used to configure UE specific PDCCH parameters such as control resource sets (CORESET), search spaces and additional parameters for acquiring the PDCCH.

It consists of fields such as controlResourceSetToAddModList, searchSpacesToAddModList and tpc-SRS.

ControlResourceSetToAddModList field includes a list of UE specifically configured Control Resource Sets (CORESETs) to be used by UE.

SearchSpacesToAddModList field includes a list of UE specifically configured Search Spaces.

TPC-SRS field enables and configures reception of group TPC commands for SRS. tpc-SRS field includes SRS-TPC-CommandConfig IE. SRS-TPC-CommandConfig is used to configure UE for extracting TPC commands for SRS from a group-TPC messages on DCI.

PDCCH-Config in RRCReconfiguration configures TYPE1 USS (UE specific Search Space).

PDCCH-Config in the sdt-MAC-PHY-CG in the sdt-Config in the RRCRelease configure TYPE2 USS (also called sdt-CG-SearchSpace).

TYPE1 USS is configured by SearchSpace IE. TYPE2 USS is configured by SearchSpace2 IE.

TYPE1 USS is applicable to and used only by only RRC_CONNECTED UE.

TYPE2 USS is applicable to and used only by RRC_INACTIVE UE. TYPE1 USS is stored in AS UE Inactive CONTEXT upon state transition from RRC_CONNECTED to RRC_INATIVE. TYPE2 USS is discarded/released upon state transition from RRC_INACTIVE to RRC_CONNECTED.

SearchSpace IE defines how/where to search for PDCCH candidates The SearchSpace IE includes following fields: a searchSpaceId, a controlResourceSetId, monitoringSlotPeriodicityAndOffset, a duration, searchSpaceType etc.

SearchSpace2 IE defines how/where to search for PDCCH candidates The SearchSpace IE includes following fields: a controlResourceSetId, monitoringSlotPeriodicityAndOffset, a duration, searchSpaceType2 etc.

ControlResourceSetId indicates the CORESET applicable for this SearchSpace. monitoringSlotPeriodicityAndOffset indicates slots for PDCCH Monitoring configured as periodicity and offset. duration indicates number of consecutive slots that a SearchSpace lasts in every occasion. searchSpaceType indicates whether this is a common search space or a UE specific search space as well as DCI formats to monitor for.

SearchSpaceType2 indicates whether this is a specific CSS (i.e. sdt-SearchSpace) or a specific USS (i.e. sdt-CG-SearchSpace).

SearchSpaceId is used to identify Search Spaces. It is an integer between 0 and 39.

Since there is only one TYPE2 CSS and only one TYPE2 USS, searchSpaceId is not used in searchSpace2 IE.

PDSCH-ConfigCommon is cell-specific PDSCH parameters of the initial BWP of the second cell. It consists of a pdsch-TimeDomainAllocationList. The pdsch-TimeDomainAllocationList is a list composed of a plurality of pdsch-TimeDomainAllocations.

PDSCH-TimeDomainAllocation is a time domain relationship between the PDCCH and the PDSCH. It consists of subfields such as K0 and startSymbolAndLength. K0 is the slot offset between the DCI and the scheduled PDSCH. startSymbolAndLength is an index indicating a valid start symbol and length combination.

PCCH-Config is configuration related to paging. It consists of sub-fields such as the base station paging period, PF-related parameters, and P0-related parameters.

BCCH-config is a configuration related to system information. It consists of subfields such as modificationPeriodCoeff indicating the length of the modification period.

UplinkConfigCommonSIB is a common uplink configuration of the serving cell. It consists of subfields such as frequencyInfoUL, initialUplinkBWP, and timeAlignmentTimerCommon.

FrequencyInfoUL-SIB is a basic parameter of the uplink carrier. It consists of subfields such as a frequency band list and carrier bandwidth for each SCS.

BWP-UplinkCommon is the configuration of the second uplink IBWP. It consists of subfields such as BWP, rach-ConfigCommon, pusch-ConfigCommon, and pucch-ConfigCommon.

PDSCH-Config IE is used to configure UE specific PDSCH parameters. It consists of dataScramblingIdentityPDSCH field and pdsch-TimeDomainAllocationList field and mcs-Table field and others.

DataScramblingIdentityPDSCH field indicates identifier used to initialize data scrambling (c_init) for PDSCH MCS-Table field indicates which MCS table UE shall use for PDSCH. If the field is absent UE applies the value 64QAM. value 64QAM means the MCS table for 64QAM. value 256QAM means the MCS table for 256QAM.

RACH-ConfigCommon is the cell-specific random access parameter of the initial BWP of the second cell. It consists of subfields such as prach-ConfigurationIndex, msg1-FrequencyStart, preambleReceivedTargetPower, ra-ResponseWindow, preambleTransMax, msg1-SubcarrierSpacing, rsrp-ThresholdSSB, rsrp-ThresholdSSB-SUL, featureCombination and ra-ContentionResolutionTimer.

RACH-ConfigCommon-fc is RACH-ConfigCommon associated with at least one featureCombination. Default RACH-ConfigCommon is RACH-ConfigCommon not associated with any featureCombination.

PRACH-ConfigurationIndex is a PRACH configuration index. One PRACH configuration corresponds to pattern information on a PRACH transmission opportunity in the time domain (information indicating in which symbol in which slot of which radio frame PRACH transmission is possible), a transmission format of a preamble, and the like.

MSG1-FrequencyStart is the offset from PRB0 of the lowest PRACH transmission opportunity. It is information indicating a PRACH transmission resource in the frequency domain. PRB0 is the lowest frequency PRB among PRBs of the corresponding carrier.

PreambleReceivedTargetPower is the target power level of the network receiving end. It is a parameter related to transmission power control during the random access procedure.

RA-ResponseWindow is the length of the random access response window expressed in the number of slots.

PreambleTransMax is the maximum number of random access preamble transmissions

MSG1-SubcarrierSpacing is PRACH's SCS. It is commonly applied to general UEs and RedCap UEs.

RSRP-ThresholdSSB is SSB selection criteria. UE performs random access by selecting a preamble corresponding to the selected SSB.

RSRP-ThresholdSSB_SUL is SUL selection criteria. UE selects SUL carrier for random access procedure based at least in part on this threshold.

RA-ContentionResolutionTimer is the initial value of the contention resolution timer. Indicates the number of subframes.

PUSCH-ConfigCommon is cell-specific PUSCH parameters of the initial BWP of the second cell. It consists of subfields like pusch-TimeDomainAllocationList. The pusch-TimeDomainAllocationList is a list composed of a plurality of pusch-TimeDomainAllocations.

PUSCH-Pusch-TimeDomainAllocation is a time domain relationship between the PDCCH and the PUSCH. It consists of subfields such as K2 and startSymbolAndLength. K2 is the slot offset between the DCI and the scheduled PUSCH.

startSymbolAndLength is an index indicating a valid combination of start symbol and length.

The IE PUSCH-Config is used to configure UE specific PUSCH parameters applicable to the initial BWP of the second cell.

It consists of dataScramblingIdentityPUSCH field, pusch-PowerControl field, pusch-TimeDomainAllocationList field, mcs-Table field and frequencyHopping field and others.

DataScramblingIdentityPUSCH field indicates an identifier used to initialize data scrambling (c_init) for PUSCH. If the field is absent, UE applies the physical cell ID. MCS-Table field indicates which MCS table UE shall use for PUSCH. If the field is absent UE applies the value 64QAM.

FrequencyHopping indicates frequency hopping scheme to be applied. The value intraSlot enables 'Intra-slot frequency hopping' and the value interSlot enables 'Inter-slot frequency hopping'. If the field is absent, frequency hopping is not configured.

PUSCH-PowerControl is used to configure UE specific power control parameter for PUSCH. It consists of p0-AlphaSets field and p0-NominalWithoutGrant field.

P0-AlphaSets field includes a plurality of P0-PUSCH-AlphaSet IEs. A P0-PUSCH-AlphaSet IE comprises a p0-PUSCH-AlphaSetId field and a p0 field.

P0 field indicates P0 value for PUSCH with grant (except msg3) in steps of 1 dB. When the field is absent UE applies the value 0.

P0-NominalWithoutGrant field indicates P0 value for UL grant-free PUSCH (configured grant based PUSCH).

PUCCH-ConfigCommon is the cell-specific PUCCH parameter of the initial BWP of the second cell. It consists of subfields such as pucch-ResourceCommon and p0-norminal.

PUCCH-ResourceCommon is an index corresponding to a cell-specific PUCCH resource parameters. One index corresponds to a PUCCH format, a PUCCH time period, a PUCCH frequency period, a PUCCH code, and the like.

P0-norminal is a power offset applied during PUCCH transmission. Defined as an integer between −202 and 24 in increments of 2. The unit is dBm.

PUCCH-ConfigCommon is used to configure UE specific PUCCH parameters. It consists of fields such as dl-DataToUL-ACK field and resourceSetToAddModList field and others.

DL-DataToUL-ACK field includes a list of timing for given PDSCH to the DL ACK.

ResourceSetToAddModList includes a list for adding PUCCH resource sets.

TDD-UL-DL-ConfigurationCommon is cell specific TDD UL/DL configuration. It consists of subfields such as referenceSubcarrierSpacing, pattern1, and pattern2.

ReferenceSubcarrierSpacing is the reference SCS used to determine the time domain boundary in the UL-DL pattern.

Pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

DL-UL-TransmissionPeriodicity indicates the period of the DL-UL pattern.

NRofDownlinkSlots indicates the number of consecutive full DL slots in each DL-UL pattern.

NRofDownlinkSymbols indicates the number of consecutive DL symbols from the beginning of the slot following the last full DL slot.

NRofUplinkSlots indicates the number of consecutive full UL slots in each DL-UL pattern.

NRofUplinkSymbols indicates the number of consecutive UL symbols at the last time point of a slot preceding the first full UL slot The operations of the terminal and the base station are listed below.

A The terminal transmits to a base station a UECapabilityInformation message.

The base station receives the terminalCapabilityInfomation message.

The UECapabilityInformation message includes zero or one Capability_Information_1 (inactiveState) and zero or one Capability_Information_2 (ra-SDT) and zero or one Capability_Information_3 (srb-SDT) and zero or one or more capability-information_4 (cg-SDT).

Capability_Information_1 is per terminal capability. Capability_Information_1 indicates whether terminal supports RRC_INACTIVE. The presence of the Capability_Information_1 indicates terminal supports RRC_INACTIVE.

Capability_Information_2 is per terminal capability. Capability_Information_2 indicates whether terminal supports transmission of data and/or signalling over allowed radio bearers in RRC_INACTIVE state via Random Access procedure. The presence of Capability_Information_2 indicates terminal supports transmission of data and/or signalling over allowed radio bearers in RRC_INACTIVE state via Random Access procedure.

Capability_Information_3 is per terminal capability. Capability_Information_3 indicates whether terminal supports the usage of signaling radio bearer SRB2 over RA-SDT or CG-SDT. The presence of Capability_Information_3 indicates terminal supports the usage of signaling radio bearer SRB2 over RA-SDT or CG-SDT.

Capability_Information_4 is per band capability. Capability_Information_4 indicates whether terminal supports transmission of data and/or signalling over allowed radio bearers in RRC_INACTIVE state via configured grant type 1. The presence of Capability_Information_4 for a band indicates that the terminal supports transmission of data and/or signalling over allowed radio bearers in RRC_INACTIVE state via configured grant type 1 in the band.

The terminal receives in a first cell from the base station a RRCRelease message.

The base station transmits in a first cell to the terminal a RRCRelease message.

the RRCRelease includes zero or one third search space. the third search space is related to a second SDT procedure. the third search space is ue specific search space.

The RRCRelease message includes a Configuration_Information_1_1 (sdt-Config). The Configuration_Information_1_1 (sdt-Config) includes a Configuration_Information_1_2 (sdt-DRB-List) and a Configuration_Information_1_3 (sdt-SRB2-Indication) and a Configuration_Information_1_4 (sdt-CG-Config) and a Configuration_Information_1_5 (sdt-DRB-ContinueEHC-UL) and a Configuration_Information_1_6 (sdt-DRB-ContinueEHC-DL).

The Configuration_Information_1_2 (sdt-DRB-List) includes zero or one or more DRB-Identities. The Configuration_Information_1_2 (sdt-DRB-List) indicates the DRBs that are configured for SDT.

The Configuration_Information_1_3 (sdt-SRB2-Indication) indicates whether SRB2 is configured for SDT or not.

The Configuration_Information_1_4 (sdt-CG-Config) includes a first Configuration_Information_1_4_1 (BWP-Uplink-Dedicated-SDT) and a second Configuration_Information_1_4_1 (BWP-Uplink-Dedicated-SDT) and a Configuration_Information_1_4_3 (BWP-Downlink-Dedicated- SDT) and a Configuration_Information_1_4_4 (cg-SDT-TimeAlignmentTimer) and a Configuration_Information_1_4_5 (cg-SDT-RSRP-ThresholdSSB) and a Configuration_Information_1_4_6 (C-RNTI) and a Configuration_Information_1_4_7 (CS-RNTI).

The Configuration_Information_1_5 (sdt-DRB-ContinueEHC-UL) in the Configuration_Information_1_1 (sdt-Config) in RRCRelease indicates whether the PDCP entities of the data radio bearers configured for SDT continue or reset the uplink EHC header compression protocol during PDCP re-establishment during SDT procedure in RRC_INACTIVE.

The Configuration_Information_1_6 (sdt-DRB-ContinueEHC-DL) in the Configuration_Information_1_1 (sdt-Config) in RRCRelease indicates whether the PDCP entities of the data radio bearers configured for SDT continue or reset the downlink EHC header compression protocol during PDCP re-establishment during SDT procedure in RRC_INACTIVE.

The Configuration_Information_1_5 (sdt-DRB-ContinueEHC-UL) in a PDCP-Config in RRCReconfiguration indicates whether the PDCP entity of the corresponding DRB continue or reset the uplink EHC header compression protocol during PDCP re-establishment in RRC_CONNECTED.

The Configuration_Information_1_6 (sdt-DRB-ContinueEHC-DL) in a PDCP-Config in RRCReconfiguration indicates whether the PDCP entity of the corresponding DRB continue or reset the downlink EHC header compression protocol during PDCP re-establishment in RRC_CONNECTED.

The Configuration_Information_1_4 (sdt-MAC-PHY-CG-Config) is used for the second SDT (CG-SDT).

The Configuration_Information_1_2 (sdt-DRB-List) and the Configuration_Information_1_3 (sdt-SRB2-Indication) and the Configuration_Information_1_5 (sdt-DRB-ContinueEHC) are used both for the first SDT (RA-SDT) and the second SDT (CG-SDT)

The Configuration_Information_1_4_1 (BWP-Uplink-Dedicated-SDT) includes zero or one Configuration_Information_1_4_1_1 (PUSCH-Config) and one or more Configuration_Information_1_4_1_2 (ConfiguredGrantConfig).

The Configuration_Information_1_4_1_1 (PUSCH-Config) is used to configure terminal specific PUSCH parameters. The Configuration_Information_1_4_1_1 (PUSCH-Config) includes zero or one Configuration_Information_1_4_1_1_1 (PUSCH-TimeDomainAllocationList).

The Configuration_Information_1_4_1_1_1 (PUSCH-TimeDomainAllocationList) is used to configure a time domain relation between PDCCH and PUSCH.

The Configuration_Information_1_4_1_1_1 (PUSCH-TimeDomainAllocationList) consists of one or more PUSCH-TimeDomainResourceAllocation.

A PUSCH-TimeDomainResourceAllocation consists of k2 and startsSymbolAndLength.

K2 indicates the distance between PDCCH and PUSCH in number of symbols.

startsSymbolAndLength indicates an index of start symbol and length.

The Configuration_Information_1_4_1_2 (ConfiguredGrantConfig) is used to configure uplink transmission without dynamic grant.

The Configuration_Information_1_4_1_2 (ConfiguredGrantConfig) consists of a configuredGrantTimer (indicating the initial value of the configured grant timer in multiples of periodicity) and a frequencyDomainAllocation (indicating the frequency domain resource allocation) and a periodicity (Periodicity for UL transmission without UL grant) and a timeDomainAllocation (indicating a combination of start symbol and length and PUSCH mapping type) and a sdt-P0-PUSCH (indicating P0 value for PUSCH for CG SDT in steps of 1 dB) and a sdt-Alpha (indicating alpha value for PUSCH for CG SDT) and a configuredGrantConfigIndex (indicating the index of the Configured Grant configurations within the BWP).

The terminal selects one of plurality of the Configuration_Information_1_4_1_2 for the first uplink MAC PDU transmission when the second SDT is triggered.

The Configuration_Information_1_4_3 (BWP-Downlink-Dedicated-SDT) consists of a PDCCH-config and a PDSCH-config.

PDCCH-config is used to configure UE specific PDCCH parameters such as control resource sets and search spaces. PDCCH-config in the Configuration_Information_1_4_3 (BWP-Downlink-Dedicated-SDT) can include sdt-cg-searchSpace.

The sdt-cg-searchSpace consists of a controlResourceSetId (indicating the CORESET applicable for this SearchSpace) and a monitoringSlotPeriodicityAndOffset (indicating slots for PDCCH Monitoring configured as periodicity and offset) and a duration(indicating the number of consecutive slots that a SearchSpace lasts in every occasion) and a searchSpaceType (indicating whether the search space is common search space or ue-Specific search space).

The searchSpoaceType for the sdt-cg-searchSpace indicates ue-specific search space.

The Configuration_Information_1_4_4 (cg-SDT-TimeAlignmentTimer) indicates TimeAlignmentTimer value for CG-SDT.

The Configuration_Information_1_4_5 (cg-SDT-RSRP-ThresholdSSB) indicates an RSRP threshold configured for SSB selection for CG-SDT.

The Configuration_Information_1_4_6 (C-RNTI) indicates the C-RNTI to be used for the first SDT procedure and for the second SDT procedure. It corresponds to the third identifier.

The Configuration_Information_1_4_7 (CS-RNTI) indicates the CS-RNTI to be used for the second SDT procedure. It corresponds to the fourth identifier.

The first bearer group (radio bearers configured for SDT) and the second bearer group (radio bearers configured for SDT except SRB1) and the third bearer group (data radio bearers configured for SDT except SRB1 and SRB2) are determined based at least in part on the Configuration_Information_1_2 (sdt-DRB-List) and the Configuration_Information_1_3 (sdt-SRB2-Indication).

The third bearer group is determined based at least in part on the Configuration_Information_1_2 (sdt-DRB-List)

The second bearer group is determined based at least in part on the Configuration_Information_1_2 (sdt-DRB-List) and the Configuration_Information_1_3 (sdt-SRB2-Indication).

The first bearer group is determined based at least in part on the Configuration_Information_1_2 (sdt-DRB-List) and the Configuration_Information_1_3 (sdt-SRB2-Indication).

RLC entity of SRB2 is re-established if the Configuration_Information_1_3 (sdt-SRB2-Indication) is included in the RRCRelease message.

A first PDCP operation (SDU discard operation) for the PDCP entity of SRB2 is performed if the Configuration_Information_1_3 (sdt-SRB2-Indication) is included in the RRCRelease message.

RLC entity of SRB1 is re-established.

The terminal trigger PDCP entities of SRB1 to discard all stored PDCP SDUs and PDCP PDUs The terminal trigger PDCP entity of SRB2 to discard all stored PDCP SDUs and PDCP PDUs if sdt-SRB2-Indication is configured in a sdt-Config in the RRCRelease The terminal performs cell selection and selects a second cell.

The terminal receives in a second cell from the base station a SIB1.

The base station transmits in a second cell a SIB1.

the SIB1 includes one or two first search space and zero or one second search space. each of the first search space is associated with either a normal uplink carrier or a supplemental uplink carrier. the first search space is related to random access procedure and the second search space is related to SDT procedure. The first search space and the second search space are common search space.

The SIB1 includes a Configuration_Information_2_1 (sdt-ConfigCommon) and a Configuration_Information_2_2 (ServingCellConfigCommonSIB).

Configuration_Information_2_1 (sdt-ConfigCommon) includes a Configuration_Information_2_1_1 (sdt-RSRP-Threshold) and a Configuration_Information_2_1_2 (sdt-DataVolumeThreshold) and a Configuration_Information_2_1_3 (t319a).

Configuration_Information_2_1_1 (sdt-RSRP-Threshold) indicates the RSRP threshold for the terminal to determine whether to perform SDT procedure.

Configuration_Information_2_1_2 (sdt-DataVolumeThreshold) indicates data volume threshold used to determine whether SDT can be initiated.

Configuration_Information_2_2 (ServingCellConfigCommonSIB) includes a Configuration_Information_2_2_1 (DownlinkConfigCommonSIB) and a first Configuration_Information_2_2_2 (UplinkConfigCommonSIB for NUL) and a second Configuration_Information_2_2_2 (UplinkConfigCommonSIB for SUL).

Configuration_Information_2_2_1 (DownlinkConfigCommonSIB) includes a Configuration_Information_2_2_1_1 (BWP-DownlinkCommon). The Configuration_Information_2_2_1_1 (BWP-DownlinkCommon) includes a Configuration_Information_2_2_1_1_1 (PDCCH-ConfigCommon) and a Configuration_Information_2_2_1_1_2 (PDSCH-ConfigCommon).

The Configuration_Information_2_2_1_1_1 (PDCCH-ConfigCommon) includes a Configuration_Information_2_2_1_1_1_1(ra-SearchSpace) and a Configuration_Information_2_2_1_1_1_2 (sdt-SearchSpace).

The Configuration_Information_2_2_1_1_1_1(ra-SearchSpace) indicates the ID of the Search space for random access procedure.

The Configuration_Information_2_2_1_1_1_2(sdt-SearchSpace) includes the configuration information of the common search space for the first SDT procedure and the second SDT procedure.

The sdt-SearchSpace consists of a controlResourceSetId (indicating the CORESET applicable for this SearchSpace) and a monitoringSlotPeriodicityAndOffset(indicating slots for PDCCH Monitoring configured as periodicity and offset) and a duration(indicating the number of consecutive slots that a SearchSpace lasts in every occasion) and a searchSpaceType (indicating whether the search space is common search space or ue-Specific search space).

The searchSpoaceType for the sdt-SearchSpace indicates common search space.

The Configuration_Information_2_2_1_1_2(PDSCH-ConfigCommon) includes a Configuration_Information_2_2_1_1_2_1(PDSCH-TimeDomainResourceAllocationList).

The Configuration_Information_2_2_1_1_2_1(PDSCH-TimeDomainResourceAllocationList) is used to configure a time domain relation between PDCCH and PDSCH.

The Configuration_Information_2_2_1_1_2_1(PDSCH-TimeDomainResourceAllocationList) consists of one or more PDSCH-TimeDomainResourceAllocation.

A PDSCH-TimeDomainResourceAllocation consists of k0 and startsSymbolAndLength.

K0 indicates the distance between PDCCH and PDSCH in number of symbols.

StartsSymbolAndLength indicates an index of start symbol and length.

The Configuration_Information_2_2_2 (UplinkConfigCommonSIB) includes a Configuration_Information_2_2_2_1 (BWP-UplinkCommon).

The Configuration_Information_2_2_2_1 (BWP-UplinkCommon) includes one or more Configuration_Information_2_2_2_1_1 (RACH-ConfigCommon) and a Configuration_Information_2_2_2_1_2 (PUSCH-ConfigCommon)

Each of the one or more Configuration_Information_2_2_2_1_1 (RACH-ConfigCommon) includes a Configuration_Information_2_2_2_1_1_1 (rsrp-ThresholdSSB-SUL that is used for uplink carrier selection) and one or more Configuration_Information_2_2_2_1_1_2 (rsrp-ThresholdSSB that is used for SSB selection) and a Configuration_Information_2_2_2_1_1_3 (Msg3SizeGroupA indicating Transport Blocks size threshold in bits for RACH preamble group selection) and a Configuration_Information_2_2_2_1_1_4 (preambleReceivedTargetPower indicating the target power level at the network receiver side) and a Configuration_Information_2_2_2_1_1_5 (powerRampingStep for PRACH) and a Configuration_Information_2_2_2_1_1_6 (prach-ConfigurationIndex indicating PRACH configuration index) and a Configuration_Information_2_2_2_1_1_7 (ra-ResponseWindow indicating the RAR window length in number of slots) and a Configuration_Information_2_2_2_1_1_8 (ContentionResolutionTimer indicating initial value for the contention resolution timer) and zero or one or more Configuration_Information_2_2_2_1_1_9 (featureCombination) and zero or one or more Configuration_Information_2_2_2_1_1_A (messagePowerOffsetGroupB which is the threshold for preamble selection) and zero or one or more Configuration_Information_2_2_2_1_1_B (deltaPreamble indicating the power offset between msg3 and RACH preamble transmission).

Configuration_Information_2_2_2_1_1_9 (featureCombination) indicates a combination of features to be associated with a random access partition (or the RACH-ConfigCommon). featureCombination consists of a redCap (If present, this field indicates that RedCap is part of this feature combination) and a smallData (If present, this field indicates that Small Data is part of this feature combination.) and a sliceGroup (If present, this field indicates slice group(s) that are part of this feature combination.) and a covEnh (If present, this field indicates that coverage enhancement is part of this feature combination.).

The Configuration_Information_2_2_2_1_2 (PUSCH-ConfigCommon) includes a Configuration_Information_2_2_2_1_2_1 (pusch-TimeDomainAllocationList) and a Configuration_Information_2_2_2_1_2_2 (msg3-DeltaPreamble)

The Configuration_Information_2_2_2_1_2_1 is used to configure a time domain relation between PDCCH and PUSCH.

The Configuration_Information_2_2_2_1_2_1 consists of one or more PUSCH-TimeDomainResourceAllocation.

A PUSCH-TimeDomainResourceAllocation consists of k2 and startsSymbolAndLength.

K2 indicates the distance between PDCCH and PUSCH in number of symbols.

startsSymbolAndLength indicates an index of start symbol and length.

The Configuration_Information_2_2_2_1_2_2 (msg3-DeltaPreamble) indicates power offset between msg3 and RACH preamble transmission The default RACH-ConfigCommon is the RACH-ConfigCommon which is located first from a plurality of RACH-Configcommon in the BWP-UplinkCommon of the selected uplink carrier. The Configuration_Information_2_2_2_1_1_9 (featureCombination) is not included in the default RACH-Configcommon.

The SIB1 includes a PUSCH-ConfigCommand and one or more RACH-ConfigCommon for a first uplink and a PUSCH-ConfigCommon and one or more RACH-ConfigCommon for a second uplink The SIB1 includes a T319a Each of the RACH-ConfigCommon includes a rsrp-ThresholdSSB-SUL and a Contention-ResolutionTimer The terminal determines to initiate either a first SDT procedure or a second SDT procedure in the second cell The terminal determines to initiate a SDT procedure based at least in part on sdt-RSRP-Threshold and sdt-DataVolumeThreshold in Configuration_Information_2_1 (sdt-ConfigCommon) in the SIB1 received in the second cell and cg-SDT-RSRP-ThresholdSSB in the Configuration_Information_1_1 (sdt-Config) in the RRCRelease received in the first cell.

The first cell and the second cell are different cells.

The terminal determines to initiate a second SDT procedure (CG-SDT) based at least in part on the first rsrp threshold (sdt-RSRP-Threshold) in the SIB1 received in the second cell and the second threshold (cg-SDT-RSRP-ThresholdSSB) in the RRCRelease received in the first cell.

The first cell and the second cell are same cell.

The terminal determines to initiate the second SDT procedure, based at least in part on that a BWP-Uplink-Dedicated-SDT for the selected uplink carrier is included in sdt-Config in RRCRelease.

The first predefined PDCP configuration and the first predefined RLC configuration and the first predefined logical channel configuration1 and the first predefined logical channel configuration2 are applied to SRB1.

A first predefined BSR configuration and a first predefined PHR configuration are applied.

PDCP entity for SRB1 is re-established.

SRB1 is resumed.

The terminal restores from UE Inactive AS Context, PDCP configurations and RLC configurations of radio bearers of the second radio bearer group.

The terminal restores from UE Inactive AS Context, stored logical channel configuration2 of radio bearers in the third radio bearer group.

A second logical channel configuration1 and a first predefined logical channel configuration2 are applied to SRB2

A third predefined logical channel configuration1 is applied to radio bearers of the third radio bearer group.

PDCP entities for radio bearers in the second radio bearer group are re-established without triggering PDCP status report.

The terminal reset EHC protocol for the radio bearers of the third radio bearer group if drb-ContinueEHC is not included in the sdt-Config in RRCRelease.

The terminal resets the uplink EHC protocol for uplink for one or more DRBs configured for SDT if drb-ContinueEHC-UL is not configured in sdt-Config in RRCRelease.

The terminal resets the downlink EHC protocol for downlink for one or more DRBs configured for SDT if drb-ContinueEHC-DL is not configured in sdt-Config in RRCRelease.

Radio bearers of the second radio bearer group are resumed.

A first variable and a second variable of PDCP entity of SRB1 are set to zero and, if SRB2 is configured for SDT, the first variable and the second variable of PDCP entity of SRB2 are set to zero.

The first variable indicates the COUNT value of the next PDCP SDU to be transmitted. The initial value is 0.

The second variable indicates the COUNT value of the next PDCP SDU expected to be received. The initial value is 0.

A reordering timer is set to infinity and the sequence number field is set to 12 bit if the first predefined PDCP configuration is applied A reassembly timer is set to a first value and the sequence number field is see to 12 bit if the first predefined RLC configuration is applied ConfiguredGrantType1Allowed is set to allowed and allowedCG-List is set to absent if the first predefined logical channel configuration2 is applied.

The priority value in the first predefined logical channel configuration1 is lower than the priority value in the second predefined logical channel configuration1. The priority value in the second predefined logical channel configuration1 is lower than the priority value in the third predefined logical channel configuration1.

The prioritisedBitRate value in the first predefined logical channel configuration1 is equal to the prioritisedBitRate value in the second predefined logical channel configuration1. The prioritisedBitRate value in the second predefined logical channel configuration1 is greater than the prioritisedBitRate value in the third predefined logical channel configuration1.

The logicalChannelGroup value in the first predefined logical channel configuration1 is equal to the logicalChannelGroup value in the second predefined logical channel configuration1. The logicalChannelGroup value in the second predefined logical channel configuration1 is different from the logicalChannelGroup value in the third predefined logical channel configuration1.

periodicBSR-Timer is set to a first value and retxBSR-Timer is set to a second value if the first predefined BSR configuration is applied.

multiplePHR is set to false if the first predefined PHR configuration is applied.

The terminal selects, based at least in part on a specific rsrp-ThresholdSSB-SUL among a plurality of rsrp-ThresholdSSB-SULs, a uplink carrier. The specific rsrp-ThresholdSSB-SUL is the one included in a first RACH-ConfigCommon IE among a plurality of RACH-ConfigCommon IEs for the first uplink.

A uplink carrier is selected based at least in part on the specific rsrp-ThresholdSSB-SUL The terminal selects for RA-SDT a RACH-ConfigCommon IE from a plurality of RACH-ConfigCommon IEs of the selected uplink carrier.

A RACH-ConfigCommon IE is selected for RA-SDT from a plurality of RACH-ConfigCommon IEs of the selected uplink carrier.

The terminal selects a SSB based at least in part on a rsrp-ThresholdSSB. The rsrp-ThresholdSSB is the one included in the selected RACH-ConfigCommon of the selected uplink carrier.

A SSB is selected based at least in part on a rsrp-ThresholdSSB. The rsrp-ThresholdSSB is the one included in the selected RACH-ConfigCommon of the selected uplink carrier.

The terminal selects preamble group based at least in part on the selected RACH-ConfigCommon of the selected uplink and the PUSCH-ConfigCommon of the selected uplink if the default RACH-ConfigCommon is selected.

The terminal selects preamble group based at least in part on the selected RACH-ConfigCommon of the selected uplink if a RACH-ConfigCommon-fc is selected.

A preamble group is selected based at least in part on a preambleReceivedTargetPower in the selected RACH-ConfigCommon of the selected uplink carrier and a msg3-DeltaPreamble in the PUSCH-ConfigCommon of the selected uplink carrier if the selected RACH-ConfigCommon of the selected uplink carrier does not include a deltaPreamble.

The preamble group based at least in part on preambleReceivedTargetPower and the deltaPreamble in the selected RACH-ConfigCommon of the selected uplink carrier if the selected RACH-ConfigCommon of the selected uplink carrier includes a deltaPreamble.

The terminal transmits to the base station a preamble based at least in part on the transmission power related parameters in the selected RACH-ConfigCommon of the selected uplink carrier The base station receives from the terminal a preamble of which transmission power is determined based at least in part on the transmission power related parameters in the selected RACH-ConfigCommon of the selected uplink carrier The terminal receives from the base station a RAR in response to the transmitted preamble The base station transmits to the terminal a RAR in response to the received preamble The terminal determines the time domain relationship based at least in part on a time resource allocation field in the RAR and a pusch-TimeDomainResourceAllocationList in the PUSCH-ConfigCommon of the selected uplink carrier if the PUSCH-ConfigCommon of the selected uplink carrier includes the pusch-TimeDomainResourceAllocationList.

The terminal determines the time domain relationship based at least in part on a time resource allocation field in the RAR and a subcarrier spacing of the initial uplink BWP of the selected uplink carrier if the PUSCH-ConfigCommon of the selected uplink carrier does not includes the pusch-TimeDomainResourceAllocationList The time domain relationship is determined based at least in part on a time resource allocation field in the RAR and a pusch-TimeDomainResourceAllocationList in the PUSCH-ConfigCommon of the selected uplink carrier if the PUSCH-ConfigCommon of the selected uplink carrier includes the pusch-TimeDomainResourceAllocationList.

The time domain relationship is determined based at least in part on a time resource allocation field in the RAR and a subcarrier spacing of the initial uplink BWP of the selected uplink carrier if the PUSCH-ConfigCommon of the selected uplink carrier does not includes the pusch-TimeDomainResourceAllocationList The terminal determines the time domain relationship.

The terminal determines the transmission power based at least in part on the selected RACH-ConfigCommon of the selected uplink and the PUSCH-ConfigCommon of the selected uplink if the default RACH-ConfigCommon is selected.

The terminal determines the transmission power based at least in part on the selected RACH-ConfigCommon of the selected uplink if a RACH-ConfigCommon-fc is selected.

The terminal transmits to the base station a first uplink MAC PDU based at least in part on the determined time relationship and the determined transmission power.

The base station receives from the terminal a first uplink MAC PDU based at least in part on the determined time relationship and the determined transmission power.

The first uplink MAC PDU includes a first CCCH SDU and optionally a BSR and optionally a PHR and optionally a MAC SDU from the third radio bearer group.

The first CCCH SDU is a RRCResumeRequest.

The terminal receives a DCI in PDCCH addressed by a temporary C-RNTI. The DCI includes a Time domain resource assignment field.

The base station transmits a DCI in PDCCH addressed by a temporary C-RNTI. The DCI includes a Time domain resource assignment field.

The terminal determines the time domain relationship based at least in part on a time resource allocation field in the DCI and a pdsch-TimeDomainResourceAllocationList in the PDSCH-ConfigCommon if the PDSCH-ConfigCommon includes the pdsch-TimeDomainResourceAllocationList.

The terminal determines the time domain relationship based at least in part on a time resource allocation field in the DCI and a default time resource allocation table if the PDSCH-ConfigCommon does not includes the pdsch-TimeDomainResourceAllocationList.

The default time resource allocation table consists of a plurality of fixed values.

The time domain relationship is determined based at least in part on a time resource allocation field in the DCI and a pdsch-TimeDomainResourceAllocationList in the PDSCH-ConfigCommon if the PDSCH-ConfigCommon includes the pdsch-TimeDomainResourceAllocationList.

The time domain relationship is determined based at least in part on a time resource allocation field in the DCI and a default time resource allocation table if the PDSCH-ConfigCommon does not includes the pdsch-TimeDomainResourceAllocationList.

The default time resource allocation table consists of a plurality of fixed values. Each of the fixed values are same or different from each other.

The terminal receives from the base station a second downlink MAC PDU (Msg 4) based at least in part on the determined time relationship.

The base station transmits to the terminal a second downlink MAC PDU (Msg 4) based at least in part on the determined time relationship.

The terminal receives a DCI in PDCCH addressed by C-RNTI. The DCI includes a Time domain resource assignment field for uplink grant.

The base station transmits a DCI in PDCCH addressed by C-RNTI. The DCI includes a Time domain resource assignment field for uplink grant.

The terminal determines the time domain relationship, based at least in part on a time resource allocation field in the DCI and a pusch-TimeDomainResourceAllocationList in the PUSCH-ConfigCommon of the first uplink carrier, if the PUSCH-ConfigCommon of the first uplink carrier includes the pusch-TimeDomainResourceAllocationList.

The terminal determines the time domain relationship, based at least in part on a time resource allocation field in the DCI and a subcarrier spacing of the initial uplink BWP of the first uplink carrier, if the PUSCH-ConfigCommon of the first uplink carrier does not includes the pusch-TimeDomainResourceAllocationList.

The first uplink carrier is the uplink carrier selected for the initial PUSCH transmission for RA-SDT.

The terminal determines the transmission power based at least in part on the first RACH-ConfigCommon of the first uplink carrier and the PUSCH-ConfigCommon of the first uplink carrier, if the default RACH-ConfigCommon is the first RACH-ConfigCommon.

The terminal determines the transmission power based at least in part on the first RACH-ConfigCommon of the first uplink carrier, if a RACH-ConfigCommon-fc is the first RACH-ConfigCommon.

The first RACH-ConfigCommon is the RACH-ConfigCommon used in the initial PUSCH transmission for RA-SDT.

The terminal transmits to the base station a second uplink MAC PDU based at least in part on the determined time relationship and the determined transmission power.

The first uplink MAC PDU includes a CCCH SDU and the second uplink MAC PDU does not include a CCCH SDU.

The terminal determines the transmission power based at least in part on sdt-P0-PUSCH and sdt-Alpha in a first configuredGrantConfig in the BWP-Uplink-Dedicated-SDT in RRCRelease.

The first configuredGrantConfig is one of the plurality of configuredGrantConfig in the BWP-Uplink-Dedicated-SDT in RRCRelease.

A configuredGrantConfig is selected as the first configuredGrantConfig if the configuredGrantConfig has the configured grant at the earliest time point for data from radio bearers configured for the SDT.

The terminal transmits to the base station a first uplink MAC PDU based at least in part on the determined transmission power.

The initial PUSCH transmission for CG-SDT ends and the subsequent PUSCH transmission for CG-SDT starts, if a downlink assignment has been received on the PDCCH for the C-RNTI and if this is the first downlink assignment after initial transmission for CG-SDT with CCCH message.

The terminal monitors PDCCH for CSS configured by ra-SearchSpace for a DCI with CRC scrambled by a first identifier (RA-RNTI) during the first period of the first SDT procedure.

The terminal monitors PDCCH for CSS configured by sdt-SearchSpace for a DCI with CRC scrambled by a second identifier (implicit C-RNTI) during the second period of the first SDT procedure.

The terminal monitors PDCCH for USS configured by a sdt-cg-SearchSpace for a DCI with CRC scrambled by a third identifier or by a fourth identifier (explicit C-RNTI or explicit CS-RNTI respectively) during the second SDT procedure.

(Alternatively) The terminal monitors PDCCH for CSS configured by sdt-SearchSpace for a DCI with CRC scrambled by a third identifier or fourth identifier during the second SDT procedure.

The base station transmits PDCCH for CSS configured by ra-SearchSpace for a DCI with CRC scrambled by a first identifier (RA-RNTI) during the first period of the first SDT procedure.

The base station transmits PDCCH for CSS configured by sdt-SearchSpace for a DCI with CRC scrambled by a second identifier (implicit C-RNTI) during the second period of the first SDT procedure.

The base station transmits for USS configured by a sdt-cg-SearchSpace for a DCI with CRC scrambled by a third identifier or by a fourth identifier (explicit C-RNTI or explicit CS-RNTI respectively) during the second SDT procedure.

(Alternatively) The base station transmits PDCCH for CSS configured by sdt-SearchSpace for a DCI with CRC scrambled by a third identifier or fourth identifier during the second SDT procedure.

The terminal monitors PDCCH for CSS configured by sdt-SearchSpace for a DCI with CRC scrambled by a second identifier (implicit C-RNTI) if the first SDT procedure is being performed.

The terminal monitors PDCCH for CSS configured by sdt-SearchSpace for a DCI with CRC scrambled by a third identifier (explicit C-RNTI) or fourth identifier (explicit CS-RNTI) if the second SDT procedure is being performed.

The base station transmits PDCCH for CSS configured by sdt-SearchSpace for a DCI with CRC scrambled by a second identifier (implicit C-RNTI) if the first SDT procedure is being performed.

The base station transmits PDCCH for CSS configured by sdt-SearchSpace for a DCI with CRC scrambled by a third identifier (explicit C-RNTI) or fourth identifier (explicit CS-RNTI) if the second SDT procedure is being performed.

The ra-SearchSpace and the sdt-SearchSpace are indicated/included in the PDCCH-ConfigCommon in the SIB1 received in the second cell.

The sdt-cg-SearchSpace is indicated/included in the RRCRelease message received in the first cell.

During the first period, the initial PUSCH transmission for a CCCH message is performed based at least in part on random access procedure. During the second period, the subsequent PUSCH transmissions are performed based at least in part on dynamic UL grants.

The sdt-SearchSpace is indicated in the PDCCH-ConfigCommon in the SIB1 received in the second cell.

The sdt-cg-SearchSpace is indicated in the RRCRelease message received in the first cell.

The first identifier(RA-RNTI) is common for a plurality of terminals and has a fixed value. the second identifier(C-RNTI) is specific to a terminal and allocated in a RAR. the third identifier(C-RNTI) is specific to a terminal and allocated in a RRCRelease message. a fourth identifier(CS-RNTI) is specific to a terminal and allocated in a RRCRelease message. The second identifier and the third identifier are used for dynamic scheduling. The fourth identifier is used for Semi-Persistent Scheduling.

The terminal starts a Contention-ResolutionTimer when a first uplink MAC PDU is transmitted, if a first SDT procedure is initiated.

The first uplink MAC PDU includes a CCCH SDU and optionally a first BSR and optionally a first PHR and optionally a MAC SDU from a radio bearer configured for SDT.

The terminal stops the ContentionResolutionTimer when a PDCCH addressed to a second identifier (T C-RNTI) is received during the first SDT procedure.

The terminal consider the SDT procedure is unsuccessful if ContentionResolutionTimer expires during the first SDT procedure. The terminal performs the actions upon going to RRC_IDLE if the SDT procedure is unsuccessful.

The ContentionResolutionTimer is indicated in a corresponding field in the selected RACH-ConfigCommon of the selected uplink carrier in SIB1 received in the second cell.

The terminal starts a configuredGrantTimer when a first uplink MAC PDU is transmitted, if a second SDT procedure is initiated.

The terminal stops the configuredGrantTimer when a PDCCH addressed to a third identifier (C-RNTI) is received during the second SDT procedure.

The terminal considers the procedure is unsuccessful if configuredGrantTimer expires during the second SDT procedure. The terminal performs the actions upon going to RRC_IDLE if the SDT procedure is unsuccessful.

The configuredGrantTimer is indicated in a corresponding field in BWP-Uplink-Dedicated-SDT of the selected uplink in sdt-Config in RRCRelease.

The terminal starts a T319a timer if a SDT procedure is initiated. The terminal restarts the T319a upon receiving a MAC SDU or transmitting a MAC SDU during the SDT procedure. The terminal performs the actions upon going to RRC_IDLE when the T319a expires. The terminal stops the T319a when RRCRelease or RRCReject or RRCResume or RRCSetup is received.

T319a timer is indicated in a corresponding field in a sdt-ConfigCommon in a SIB1 received in the second cell A Contention-ResolutionTimer is started when a first uplink MAC PDU is received, if a first SDT procedure is initiated.

The first uplink MAC PDU includes a CCCH SDU and optionally a first BSR and optionally a first PHR and optionally a MAC SDU from a radio bearer configured for SDT.

The ContentionResolutionTimer stops when a PDCCH addressed to a second identifier (T C-RNTI) is received during the first SDT procedure.

The SDT procedure is unsuccessful if ContentionResolutionTimer expires during the first SDT procedure The ContentionResolutionTimer is indicated in a corresponding field in the selected RACH-ConfigCommon of the selected uplink carrier in SIB1 received in the second cell.

A configuredGrantTimer starts when a first uplink MAC PDU is transmitted, if a second SDT procedure is initiated.

The configuredGrantTimer stops when a PDCCH addressed to a third identifier (C-RNTI) is received during the second SDT procedure.

The procedure is unsuccessful when configuredGrantTimer expires during the second SDT procedure The configuredGrantTimer is indicated in a corresponding field in BWP-Uplink-Dedicated-SDT of the selected uplink in sdt-Config in RRCRelease.

A T319a timer starts if a SDT procedure is initiated. The T319a restarts upon receiving a MAC SDU or transmitting a MAC SDU during the SDT procedure. The actions upon going to RRC_IDLE are performed when the T319a expires. The T319a stops when RRCRelease or RRCReject or RRCResume or RRCSetup is transmitted.

T319a timer is indicated in a corresponding field in a sdt-ConfigCommon in a SIB1 received in the second cell.

one or more ContentionResolutionTimer fields and a single T319a field are included in the SIB1 and one or more ContentionResolutionTimer fields are included in the RRCRelease.

Actions upon going to RRC_IDLE comprises releasing SDT-config and stopping first timers and discarding the second identifier (implicit C-RNTI) and the third identifier (explicit C-RNTI) and entering RRC_IDLE.

The first timers include the Contention-ResolutionTimer and the ConfiguredGrantTimer.

The terminal transmits to the base station a first uplink MAC PDU based at least in part on the determined time relationship and the determined transmission power.

The base station receives from the terminal a first uplink MAC PDU based at least in part on the determined time relationship and the determined transmission power.

The first uplink MAC PDU includes a first CCCH SDU and optionally a first BSR and optionally a first PHR and optionally a MAC SDU from the third radio bearer group.

The format of the first PHR is determined based at least in part on the first predefined PHR configuration.

The first PHRs is cancelled when there is an ongoing SDT procedure and the UL grant in the RAR can accommodate all pending data available for transmission and the first BSR MAC CE plus itsubheader but is not sufficient to additionally accommodate the first PHR MAC CE plus its subheader.

The RRCRelease includes a PUSCH-Config and one or more ConfiguredGrantConfig for a first uplink carrier and a PUSCH-Config and one or more ConfiguredGrantConfig for a second uplink carrier The terminal trigger PDCP entity of SRB2 to discard all stored PDCP SDUs and PDCP PDUs if RRCRelease is received and if sdt-SRB2-Indication is configured A first variable and a second variable of PDCP entity of SRB2 are set to zero if SDT is initiated and if SRB2 is configured for SDT.

The first variable indicates the COUNT value of the next PDCP SDU to be transmitted and the second variable indicates the COUNT value of the next PDCP SDU expected to be received.

The RRCRelease includes zero or one DRB-ContinueEHC-UL and zero or one DRB-ContinueEHC-DL.

DRB-ContinueEHC-UL in sdt-Config in RRCRelease indicates whether one or more PDCP entities of the DRBs configured for SDT continue or reset the uplink EHC header compression protocol during PDCP re-establishment in SDT procedure in RRC_INACTIVE.

DRB-ContinueEHC-DL in sdt-Config in RRCRelease indicates whether one or more PDCP entities of the DRBs configured for SDT continue or reset the downlink EHC header compression protocol during PDCP re-establishment in SDT procedure in RRC_INACTIVE.

DRB-ContinueEHC-UL in PDCP-Config in RRCReconfiguration indicates whether the PDCP entity of the corresponding DRB continues or resets the uplink EHC header compression protocol during PDCP re-establishment in RRC_CONNECTED.

DRB-ContinueEHC-DL in PDCP-Config in RRCReconfiguration indicates whether the PDCP entity of the corresponding DRB continues or resets the downlink EHC header compression protocol during PDCP re-establishment in RRC_CONNECTED.

The terminal determines SRB2 is configured for SDT if sdt-SRB2-Indication is included in the sdt-Config in RRCRelease.

The terminal determines a DRB is configured for SDT if corresponding DRB-Identity is included in the sdt-DRB-List in the sdt-Config in RRCRelease.

The first uplink carrier is NUL(normal uplink) and the second uplink carrier is SUL(supplemental uplink).

The first SDT procedure is initiated with a transmission over RACH and continue with transmission based at least in part on dynamic scheduling.

The second SDT procedure is initiated with a transmission over Type 1 CG resources and continue with transmission based at least in part on dynamic scheduling or based at least in part on configured grant.

The terminal performs PUSCH transmission based at least in part on the determined time domain relationship.

The base station performs PUSCH reception based at least in part on the determined time domain relationship.

If the selected RACH-ConfigCommon does not include a deltaPreamble, the terminal selects a preamble group based at least in part on a preambleReceivedTargetPower in the selected RACH-ConfigCommon of the selected uplink carrier and a msg3-DeltaPreamble in the PUSCH-ConfigCommon of the selected uplink carrier.

If the selected RACH-ConfigCommon includes a deltaPreamble, the terminal selects the preamble group based at least in part on preambleReceivedTargetPower and the deltaPreamble in the selected RACH-ConfigCommon of the selected uplink carrier.

The terminal initiates transmission of the UEAssistanceInformation message to provide nonSDT-DataIndication if data and/or signalling mapped to radio bearers not configured for SDT becomes available during the first SDT procedure or the second SDT procedure NonSDT-DataIndication is includes a IE indicating a cause value.

The terminal transmits a fourth uplink MAC PDU based at least in part on the determined transmission power. The fourth uplink MAC PDU includes UEAssistanceInformation (DCCH/SRB1 SDU).

The base station receives a fourth uplink MAC PDU based at least in part on the determined transmission power. The fourth uplink MAC PDU includes UEAssistanceInformation (DCCH/SRB1 SDU).

If the first SDT is being performed, uplink transmission power of the fourth uplink MAC PDU is determined based at least in part on the preambleReceivedTargetPower in the first RACH-ConfigCommon of the first uplink carrier and a delta.

If the deltaPreamble is included in the first RACH-ConfigCommon of the first uplink carrier, the delta is a deltaPreamble in the first RACH-ConfigCommon of the first uplink carrier.

If the deltaPreamble is not included in the first RACH-ConfigCommon of the first uplink carrier, the delta is a msg3-DeltaPreamble in the PUSCH-ConfigCommon of the first uplink carrier.

The first RACH-ConfigCommon is the RACH-ConfigCommon used in(or selected for) the initial PUSCH transmission for RA-SDT (or the first uplink MAC PDU including CCCH/SRB0 SDU).

The first uplink carrier is the uplink carrier used in(or selected for) the initial PUSCH transmission for RA-SDT (or the first uplink MAC PDU including CCCH/SRB0 SDU).

Uplink transmission power of the fourth uplink MAC PDU is determined based at least in part on the p0-NominalWithoutGrant in the PUSCH-Config of the selected uplink carrier and the sdt-P0-PUSCH in the ConfiguredGrantConfig of the configured grant used for the fourth uplink MAC PDU.

The p0-NominalWithoutGrant is offset for PUSCH transmission without UL grant. The first RACH-ConfigCommon is the RACH-ConfigCommon used in(or selected for) the initial PUSCH transmission for RA-SDT (or the first uplink MAC PDU including CCCH/SRB0 SDU).

The first uplink carrier is the uplink carrier used in(or selected for) the initial PUSCH transmission for RA-SDT (or the first uplink MAC PDU including CCCH/SRB0 SDU).

The first uplink carrier is the uplink carrier indicated by UL/SUL indicator in the DCI for scheduling of PUSCH.

The terminal determines the transmission power for the first uplink MAC PDU.

The terminal transmits the first uplink MAC PDU based at least in part on the determined transmission power.

The terminal receives a DCI for scheduling PDSCH in PDCCH.

The DCI includes a Time domain resource assignment field.

The terminal performs PDSCH reception based at least in part on the determined time domain relationship.

If the PDSCH-ConfigCommon in SIB1 received in the second cell includes the pdsch-TimeDomainResourceAllocationList and if the first SDT procedure is being performed, the time domain relationship is determined based at least in part on a time resource allocation field in the DCI received for the second identifier and a pdsch-TimeDomainResourceAllocationList in the PDSCH-ConfigCommon.

If the PUSCH-ConfigCommon in SIB1 received in the second cell does not includes the pusch-TimeDomainResourceAllocationList and if the first SDT procedure is being performed, the time domain relationship is determined based at least in part on a time resource allocation field in the DCI received for the second identifier and a default time domain resource allocation.

If the PDSCH-Config in RRCRelease received in the first cell includes the pdsch-TimeDomainResourceAllocationList and if the second SDT procedure is being performed, the time domain relationship is determined based at least in part on a time resource allocation field in the DCI received for the third or fourth identifier and a pdsch-TimeDomainResourceAllocationList in the PDSCH-Config.

If the PDSCH-Config in RRCRelease received in the first cell does not include the pdsch-TimeDomainResourceAllocationList and if the PDSCH-ConfigCommon in SIB1 received in the second cell includes the pdsch-TimeDomainResourceAllocationList and if the second SDT procedure is being performed, the time domain relationship is determined based at least in part on a time resource allocation field in the DCI received for the third or fourth identifier and a pdsch-TimeDomainResourceAllocationList in the PDSCH-ConfigCommon.

If the PDSCH-Config in RRCRelease received in the first cell does not include the pdsch-TimeDomainResourceAllocationList and if the PDSCH-ConfigCommon in SIB1 received in the second cell does not includes the pusch-TimeDomainResourceAllocationList and if the second SDT procedure is being performed, the time domain relationship is determined based at least in part on a time resource allocation field in the DCI received for the third or fourth identifier and a default time domain resource allocation.

If RA-SDT is performed, uplink transmission power of the first uplink MAC PDU is determined based at least in part on the preambleReceivedTargetPower in the selected RACH-ConfigCommon of the selected uplink carrier and a delta.

If the deltaPreamble is included in the RACH-ConfigCommon of the selected uplink carrier, the delta is a deltaPreamble in the selected RACH-ConfigCommon of the selected uplink carrier.

If the deltaPreamble is not included in the RACH-ConfigCommon of the selected uplink carrier, the delta is a msg3-DeltaPreamble in the PUSCH-ConfigCommon of the selected uplink carrier.

If CG-SDT is performed, uplink transmission power of the first uplink MAC PDU is determined based at least in part on the p0-NominalWithoutGrant in the PUSCH-Config of the selected uplink carrier and the sdt-P0-PUSCH in the ConfiguredGrantConfig of the configured grant used for the first uplink MAC PDU.

If the PUSCH-ConfigCommon of the selected uplink carrier in SIB1 includes the pusch-TimeDomainResourceAllocationList and if the first SDT procedure is ongoing, the time domain relationship is determined based at least in part on a time resource allocation field in the uplink grant received for the second identifier and a pusch-TimeDomainResourceAllocationList in the PUSCH-ConfigCommon of the selected uplink carrier.

If the PUSCH-ConfigCommon of the selected uplink carrier in SIB1 does not includes the pusch-TimeDomainResourceAllocationList and if the first SDT procedure is ongoing, the time domain relationship is determined based at least in part on a time resource allocation field in the uplink grant received for the second identifier and a subcarrier spacing of the initial uplink BWP of the selected uplink carrier.

If the PUSCH-Config of the selected uplink carrier in RRCRelease includes the pusch-TimeDomainResourceAllocationList and if the second SDT procedure is ongoing, the time domain relationship is determined based at least in part on a time resource allocation field in the uplink grant received for the third identifier and a pusch-TimeDomainResourceAllocationList in the PUSCH-Config of the selected uplink carrier.

If the PUSCH-Config of the selected uplink carrier in RRCRelease does not include the pusch-TimeDomainResourceAllocationList and if the PUSCH-ConfigCommon of the selected uplink carrier in SIB1 includes the pusch-TimeDomainResourceAllocationList and if the second SDT procedure is ongoing, the time domain relationship is determined based at least in part on a time resource allocation field in the uplink grant received for the third identifier and a pusch-TimeDomainResourceAllocationList in the PUSCH-ConfigCommon of the selected uplink carrier.

If the PUSCH-Config of the selected uplink carrier in RRCRelease does not include the pusch-TimeDomainResourceAllocationList and if the PUSCH-ConfigCommon of the selected uplink carrier in SIB1 does not include the pusch-TimeDomainResourceAllocationList and if the second SDT procedure is ongoing, the time domain relationship is determined based at least in part on a time resource allocation field in the uplink grant received for the second identifier and a subcarrier spacing of the initial uplink BWP of the selected uplink carrier.

Each of the ConfiguredGrantConfig includes a configuredGrantTimer.

FIG. 3 is a flow diagram illustrating an operation of a terminal.

In 3A-05, terminal receives a RRCRelease message in the first cell.

In 3A-10, terminal receives SIB1 in the second cell after cell selection toward the second cell.

In 3A-15, terminal determines the uplink carrier based on the information in SIB1.

In 3A-20, terminal determines to initiate SDT procedure.

In 3A-25, terminal starts a Contention-ResolutionTimer when a first uplink MAC PDU is transmitted, if a first SDT procedure is initiated. The first uplink MAC PDU includes a CCCH SDU and optionally a first BSR and optionally a first PHR and optionally a MAC SDU from a radio bearer configured for SDT. Terminal stops the ContentionResolutionTimer when a PDCCH addressed to a second identifier (T C-RNTI) is received during the first SDT procedure. Terminal considers the SDT procedure is unsuccessful if ContentionResolutionTimer expires during the first SDT procedure. The Terminal performs the actions upon going to RRC_IDLE if the SDT procedure is unsuccessful. The ContentionResolutionTimer is indicated in a corresponding field in the selected RACH-ConfigCommon of the selected uplink carrier in SIB1 received in the second cell.

Terminal starts a configuredGrantTimer when a first uplink MAC PDU is transmitted, if a second SDT procedure is initiated. Terminal stops the configuredGrantTimer when a PDCCH addressed to a third identifier (C-RNTI) is received during the second SDT procedure.

Terminal considers the procedure is unsuccessful if configuredGrantTimer expires during the second SDT procedure. The Terminal performs the actions upon going to RRC_IDLE if the SDT procedure is unsuccessful.

The configuredGrantTimer is indicated in a corresponding field in BWP-Uplink-Dedicated-SDT of the selected uplink in sdt-Config in RRCRelease.

Figure 4A:
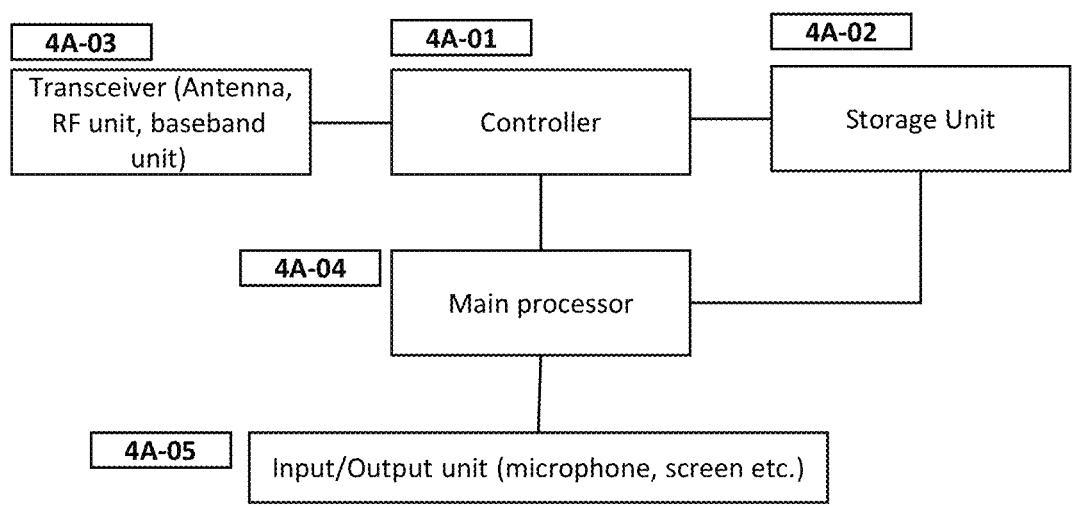
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
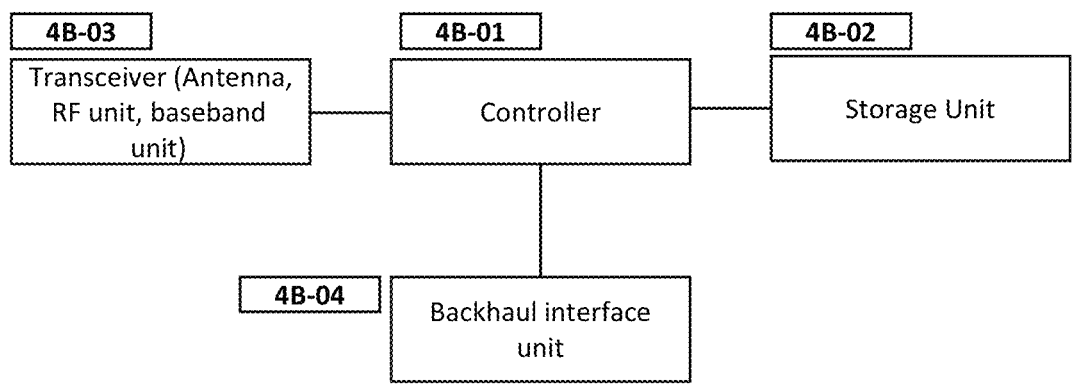
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal in a communication system, the method comprising:
   receiving a RRCRelease from a base station, wherein the RRCRelease comprises first information for small data transmission (SDT), the first information comprises a signaling radio bearer2 (SRB2) indicator, a data radio bearer (DRB) list, and a first timer value;
   performing cell selection;
   receiving a SystemInformationBlock1 in selected cell, wherein the SystemInformationBlock1 comprises second information for SDT, wherein the second information comprises a first threshold value and a second threshold value, wherein the first threshold value is related to a reference signal received power and the second threshold value is related to data volume;
   initiating a SDT procedure based on the first information and the second information;
   transmitting a Medium Access Control (MAC) Protocol Data Unit (PDU) comprising Common Control Channel (CCCH) Service Data Unit (SDU) for initial Physical Uplink Shared Channel (PUSCH) transmission;
   starting a first timer;
   monitoring a Physical Downlink Control Channel (PDCCH) for a first identifier based on a first search space or a second search space; and
   stopping the first timer in case that a downlink assignment for the first identifier is received via the PDCCH,
   wherein state transition to RRC_IDLE state is performed in case that the first timer expires.

2. The method of claim 1,
   wherein the first timer is set by one of one or more first timer values comprised in the RRCRelease.

3. The method of claim 1, wherein:
   the terminal monitors the PDCCH based on the first search space in case that the first search space configuration information is comprised in the RRCRelease;
   the terminal monitors the PDCCH based on the second search space in case that the first search space is not configured in the RRCRelease;
   the first search space is a user equipment (UE) specific search space and the second search space is a common search space; and
   the second search space is configured based on the SystemInformationBlock1.

4. A terminal in a wireless communication system, the terminal comprising:
   a transceiver configured to transmit and receive a signal, and
   a controller configured to control the transceiver to:
   receive a RRCRelease from a base station, wherein the RRCRelease comprises first information for small data transmission (SDT), the first information comprises a signaling radio bearer2 (SRB2) indicator, a data radio bearer (DRB) list, and a first timer value,
   perform cell selection,
   receive a SystemInformationBlock1 in selected cell, wherein the SystemInformationBlock1 comprises second information for SDT, wherein the second information comprises a first threshold value and a second threshold value, wherein the first threshold value is related to a reference signal received power and the second threshold value is related to data volume,
   initiate a SDT procedure based on the first information and the second information,
   transmit a Medium Access Control (MAC) Protocol Data Unit (PDU) comprising Common Control Channel (CCCH) Service Data Unit (SDU) for initial Physical Uplink Shared Channel (PUSCH) transmission,
start a first timer,
monitor a Physical Downlink Control Channel (PDCCH) for a first identifier based on a first search space or a second search space, and
stop the first timer in case that a downlink assignment for the first identifier is received via the PDCCH,
wherein state transition to RRC_IDLE state is performed in case that the first timer expires.

* * * * *